(12) United States Patent
Akiyama

(10) Patent No.: US 8,877,407 B2
(45) Date of Patent: Nov. 4, 2014

(54) POLYMER ELECTROLYTE FUEL CELL AND METHOD FOR PRODUCING THE SAME

(75) Inventor: Takashi Akiyama, Osaka (JP)

(73) Assignee: Panasonic Corporation, Osaka (JP)

( * ) Notice: Subject to any disclaimer, the term of this patent is extended or adjusted under 35 U.S.C. 154(b) by 268 days.

(21) Appl. No.: 13/479,029

(22) Filed: May 23, 2012

(65) Prior Publication Data

US 2013/0029246 A1 Jan. 31, 2013

(30) Foreign Application Priority Data

Jul. 28, 2011 (JP) ................... 2011-164968

(51) Int. Cl.
*H01M 4/86* (2006.01)
*H01M 8/10* (2006.01)
*H01M 4/88* (2006.01)
*H01M 8/02* (2006.01)

(52) U.S. Cl.
CPC .......... *H01M 4/8605* (2013.01); *H01M 8/1002* (2013.01); *H01M 4/8626* (2013.01); *H01M 4/8636* (2013.01); *H01M 4/881* (2013.01); *H01M 4/8828* (2013.01); *H01M 8/0234* (2013.01); *H01M 8/0239* (2013.01); *H01M 8/0245* (2013.01); *H01M 8/0263* (2013.01); *H01M 8/1009* (2013.01); *H01M 2008/1095* (2013.01); *Y02E 60/523* (2013.01)
USPC .......................................... 429/523; 429/483

(58) Field of Classification Search
None
See application file for complete search history.

(56) References Cited

U.S. PATENT DOCUMENTS

| 6,916,573 B2* | 7/2005 | Trabold et al. ................ 429/483 |
| 2002/0127452 A1* | 9/2002 | Wilkinson et al. ............. 429/32 |
| 2005/0095494 A1* | 5/2005 | Fuss et al. ........................ 429/39 |
| 2008/0020261 A1* | 1/2008 | Hendricks et al. .............. 429/40 |
| 2011/0020726 A1* | 1/2011 | Matsuoka ..................... 429/480 |

FOREIGN PATENT DOCUMENTS

| JP | 2001-085033 | 3/2001 |
| JP | 2005-032515 A | 2/2005 |
| JP | 2006-085932 A | 3/2006 |
| JP | 2006-179216 A | 7/2006 |
| JP | 2008-041488 | 2/2008 |

* cited by examiner

*Primary Examiner* — Jonathan Crepeau
(74) *Attorney, Agent, or Firm* — McDermott Will & Emery LLP

(57) ABSTRACT

A polymer electrolyte fuel cell includes a membrane electrode assembly including an anode, a cathode, and an electrolyte membrane, an anode-side separator having a fuel flow channel for supplying fuel, and a cathode-side separator having an oxidant flow channel for supplying oxidant. The anode includes an anode catalyst layer and an anode diffusion layer, and the cathode includes a cathode catalyst layer and a cathode diffusion layer. At least one of the fuel flow channel and the oxidant flow channel has a plurality of parallel linear portions. The anode catalyst layer or the cathode catalyst layer has a plurality of belt-like first regions facing the linear portions and at least one second region between the adjacent first regions. The amount of catalyst in the first regions per unit area is on average larger than the amount of catalyst in the at least one second region per unit area.

9 Claims, 4 Drawing Sheets

POLYMER ELECTROLYTE FUEL CELL AND METHOD FOR PRODUCING THE SAME

FIELD OF THE INVENTION

This invention relates to the structure of a catalyst layer of an electrode for a polymer electrolyte fuel cell. More particularly, the invention relates to a fuel cell in which the amount of catalyst in a catalyst layer per unit area is changed in relation to the groove and protruding portion of a separator having a flow channel for supplying a fuel gas or an oxidant gas to an electrode.

BACKGROUND OF THE INVENTION

Fuel cells are classified into polymer electrolyte (solid polymer) fuel cells, phosphoric acid fuel cells, alkaline fuel cells, molten carbonate fuel cells, solid oxide fuel cells, etc. according to the kind of the electrolyte used. Among them, polymer electrolyte fuel cells (PEFCs) are becoming commercially available as the power source for automobiles, home cogeneration systems, etc, because they operate at low temperatures and have high output densities.

Recently, the use of fuel cells as the power source for portable small electronic devices, such as notebook personal computers, cellular phones, and personal digital assistants (PDAs), has been examined. Fuel cells can generate power continuously if they get refueled. Thus, the use of fuel cells in place of secondary batteries which need recharging is expected to improve the convenience of portable small electronic devices. Also, PEFCs are advantageous as the power source for portable small electronic devices due to the low operating temperature as mentioned above. Fuel cells are also becoming commercially available as the power source in outdoor leisure activities such as camping.

Among PEFCs, direct oxidation fuel cells (DOFCs) use a fuel that is liquid at room temperature, and generate electrical energy by directly oxidizing the fuel without reforming it into hydrogen. Thus, direct oxidation fuel cells do not require a reformer and can be easily miniaturized.

Among direct oxidation fuel cells, direct methanol fuel cells (DMFCs), which use methanol as the fuel, are superior in energy efficiency and output power to other direct oxidation fuel cells. They are thus regarded as the most promising power source for portable small electronic devices.

The reactions of DMFCs at the anode and the cathode are represented by the following reaction formulae (11) and (12), respectively. Oxygen introduced into the cathode is usually sucked from the air.

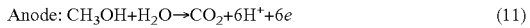
$$\text{Anode: } CH_3OH + H_2O \rightarrow CO_2 + 6H^+ + 6e \quad (11)$$

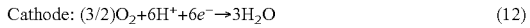
$$\text{Cathode: } (3/2)O_2 + 6H^+ + 6e^- \rightarrow 3H_2O \quad (12)$$

The technical problems of polymer electrolyte fuel cells are described below.

In a catalyst layer of an electrode included in a polymer electrolyte fuel cell, a three-phase interface between a phase in which a reactant is transported, a phase in which ions are conducted, and a phase in which electrons are conducted is an active site. It is very important to form a three-phase interface efficiently in order to increase output and power generation efficiency or reduce the amount of catalyst to reduce costs.

In order to form a three-phase interface efficiently, Japanese Laid-Open Patent Publication No. 2001-85033 (hereinafter "Patent Document 1") proposes forming a plurality of ridges and a plurality of grooves between the ridges on a surface of an electrode substrate or a solid polymer electrolyte membrane, and attaching a catalyst to the ridgelines where the top faces of the ridges and the walls of the grooves intersect.

Also, in order to supply a fuel or an oxidant to the three-phase interface efficiently, Japanese Laid-Open Patent Publication No. 2008-41488 (hereinafter "Patent Document 2") proposes providing a diffusion layer with through-holes penetrating the thickness thereof, and providing a catalyst layer with grooves that form flow channels in the plane direction thereof. It proposes disposing a catalyst in the positions corresponding to the through-holes of the diffusion layer so that the fuel or oxidant having passed through the through-holes can be smoothly supplied to the catalyst layer.

The techniques disclosed in Patent Documents 1 and 2 are effective for forming a three-phase interface efficiently and supplying the fuel or oxidant smoothly. However, according to these techniques, the catalyst layer is formed only on part of the electrolyte membrane. Thus, the technical problems of polymer electrolyte fuel cells described below may be aggravated, and an overall improvement in output and power generation efficiency may not be achieved.

The first problem relates to an improvement in output density per unit (projected) area. Generally, a fuel cell is used in the form of a fuel cell stack comprising a plurality of cells stacked in series. Thus, the output density of the fuel cell stack increases with increasing output per unit (projected) area of electrode in the stacking direction of the cells, i.e., the area-based output density. An increase in output density allows reductions in the size, weight, or costs of the fuel cell system.

To increase the output density per unit area, it is also important to increase the number of three-phase interfaces and supply a fuel and an oxidant smoothly. However, the active site in a catalyst layer to which protons are supplied most smoothly is the interface between the electrolyte membrane and the catalyst layer closest to the electrolyte membrane. Patent Documents 1 and 2 disclose a cell structure in which part of the interface has no catalyst layer. With such a cell structure, the electrolyte membrane cannot be effectively utilized, and it is difficult to increase the output density.

The second problem is a problem characteristic of direct oxidation fuel cells such as DMFCs. That is, there is a need to prevent a liquid fuel (e.g., an aqueous methanol solution) supplied from the fuel flow channel from permeating the anode and the electrolyte membrane, reaching the cathode, and being oxidized in the cathode catalyst layer. This phenomenon is called fuel crossover, and in the case of DMFCs, it is called methanol crossover (MCO). Such a phenomenon occurs because a water-soluble liquid fuel is often used. A water-soluble liquid fuel tends to permeate the electrolyte membrane that tends to absorb water.

Such fuel crossover lowers the fuel utilization efficiency because the fuel is not consumed at the anode. Further, the oxidation reaction of the crossover fuel at the cathode conflicts with the cathode reaction, i.e., the reduction reaction of the oxidant (oxygen) at the cathode, thereby lowering the cathode potential. This results in a decrease in cell voltage and power generation efficiency.

To solve this problem, for example, in DMFCs, electrolyte membranes that allow little methanol to permeate therethrough are being actively developed to reduce MCO. However, currently available electrolyte membranes conduct protons through water present in the membranes, and thus, the electrolyte membranes require water. Also, methanol has high affinity for water. It is thus difficult to sufficiently prevent methanol from permeating the electrolyte membrane together with water The movement of liquid fuel inside the electrolyte membrane is due mainly to concentration diffusion. It is thus known that the degree of fuel crossover is significantly dependent on the difference in fuel concentration between the anode-side surface and the cathode-side surface of the electrolyte membrane. The fuel concentration on the cathode-side surface of the electrolyte membrane is believed to be negligibly small, because the crossover fuel is promptly oxidized at the cathode. Thus, after all, the amount of fuel crossover is significantly dependent on the fuel concentration on the anode-side surface of the electrolyte membrane.

In the structures disclosed in Patent Documents 1 and 2, part of the electrolyte membrane is not in contact with the anode catalyst layer or the anode diffusion layer. In such a structure, the fuel supplied to the fuel flow channel directly reaches the surface of the electrolyte membrane without being consumed in the anode catalyst layer. As a result, the fuel concentration on the anode-side surface of the electrolyte membrane increases and the amount of fuel crossover increases.

BRIEF SUMMARY OF THE INVENTION

The invention intends to improve the inefficient electrode structure of conventional art, and reduce the amount of catalyst while maintaining or increasing the output density and power generation efficiency of fuel cells.

One aspect of the invention relates to a polymer electrolyte fuel cell including at least one cell. The cell includes: a membrane electrode assembly including an anode, a cathode, and an electrolyte membrane disposed between the anode and the cathode, the anode including an anode catalyst layer containing an anode catalyst on one main surface of the electrolyte membrane and an anode diffusion layer laminated on the anode catalyst layer, the cathode including a cathode catalyst layer containing a cathode catalyst on the other main surface of the electrolyte membrane and a cathode diffusion layer laminated on the cathode catalyst layer; an anode-side separator having a surface with a fuel flow channel for supplying a fuel to the anode; and a cathode-side separator having a surface with an oxidant flow channel for supplying an oxidant to the cathode. At least one of the fuel flow channel and the oxidant flow channel has a plurality of parallel linear portions. At least one of the anode catalyst layer and the cathode catalyst layer has a plurality of belt-like first regions facing the plurality of linear portions and at least one second region between the adjacent first regions. The amount of catalyst in the first regions per unit (projected) area is on average larger than the amount of catalyst in the at least one second region per unit (projected) area.

That is, at least one of the anode catalyst layer and the cathode catalyst layer has belt-like first catalyst layers (corresponding to the first regions) and at least one second catalyst layer (corresponding to the second region(s)) which are formed alternately in parallel with the linear portions of the fuel flow channel or the oxidant flow channel.

In a preferable embodiment of the invention, in the first regions, the amount of catalyst per unit area increases from an end toward a center in a width direction thereof. Also, in the at least one second region, the amount of catalyst per unit area decreases from an end toward a center in a width direction thereof. The largest amount of catalyst in the first regions per unit area is not less than 1.1 times and not more than twice the smallest amount of catalyst in the at least one second region per unit area.

In a more preferable embodiment of the invention, the portion of each of the first regions in which the amount of catalyst per unit area is largest faces a central part of each of the linear portions in a width direction thereof. Also, the portion of the at least one second region in which the amount of catalyst per unit area is smallest faces a central part of the surface (linear protruding portion, so-called "land") of the separator between the adjacent linear portions in a width direction thereof.

The total width of a pair of the first and second regions is, for example, 1 mm or more and 5 mm or less.

In a preferable embodiment of the invention, at least one of the anode diffusion layer and the cathode diffusion layer includes a substrate comprising conductive fibers and a microporous layer including conductive particles and a water-repellent resin. The microporous layer is in contact with the anode catalyst layer or the cathode catalyst layer in such a manner that no gaps are formed between the microporous layer and the first regions and between the microporous layer and the at least one second region.

The whole areas of the first regions do not necessarily face the plurality of linear portions, and the whole areas of the second regions do not necessarily face the surface (protruding portion) of the separator. However, the ratio of the total area of the first regions and the at least one second region to the projected area of the anode catalyst layer or the cathode catalyst layer is preferably 70 to 100%.

In a preferable embodiment of the invention, the average thickness of the first regions is greater than that of the at least one second region. The density of the first regions may be equal to or higher than that of the second regions.

In a preferable embodiment of the invention, at least one of the fuel flow channel and the oxidant flow channel is a serpentine flow channel having the linear portions and curved portions for connecting an adjacent pair of the linear portions.

The fuel is at least one selected from the group consisting of, for example, methanol, ethanol, ethylene glycol, and dimethyl ether.

Another aspect of the invention relates to a method for producing a polymer electrolyte fuel cell, including the steps of: (a) forming an anode catalyst layer on one main surface of an electrolyte membrane and forming a cathode catalyst layer on the other main surface of the electrolyte membrane; and (b) laminating an anode diffusion layer and a cathode diffusion layer on the anode catalyst layer and the cathode catalyst layer, respectively, to form an anode and a cathode on the electrolyte membrane to produce a membrane electrode assembly. The step (a) includes the steps of: (i) preparing a catalyst ink containing a catalyst, an electrolyte, and a dispersion medium; (ii) preparing a spray coater having a spray nozzle that is capable of moving in the directions of an X axis and a Y axis which are orthogonal to each other and capable of spraying the ink on an X-Y plane having the X axis and the Y axis; (iii) preparing an electrolyte membrane or a substrate and placing the electrolyte membrane or the substrate in parallel with the X-Y plane within an area in which the spray nozzle is capable of moving; and (iv) spraying the ink from the spray nozzle while moving the spray nozzle in the direction of the X axis in an area between a straight line $X=X0$ and a straight line $X=X0+L$, to form a plurality of belt-like catalyst layers on a surface of the electrolyte membrane or the substrate along a plurality of straight lines $Y=Y0+n\Delta Y$ where $n=0, 1, 2, \ldots m$, and m is an integer of 1 or more. The belt-like catalyst layers include first linear regions along the straight lines $Y=Y0+n\Delta Y$ and at least one second linear region along straight lines $Y=Y0+(2N-1)\times\Delta Y/2$ where $N=1, 2, \ldots M$, M is an integer of 1 or more, and $\Delta Y$ is selected so that the amount of catalyst in the first linear regions per unit area is not less than 1.1 times and not more than twice the amount of catalyst in the at least one second linear region per unit area.

That is, in this production method, the first catalyst layers (corresponding to the first regions) and the at least one second catalyst layer (corresponding to the second region(s)) can be formed by spraying a catalyst ink containing a catalyst powder, an electrolyte, and a dispersion medium on a surface of an electrolyte membrane or a predetermined substrate from a spray gun and drying it.

Of the plurality of belt-like catalyst layers, the L+1th belt-like catalyst layer is preferably formed after the Lth belt-like catalyst layer is dried, where L is an integer of 1 or more.

The production method can further include the step of preparing an anode-side separator having a fuel flow channel for supplying a fuel to the anode and a cathode-side separator having an oxidant flow channel for supplying an oxidant to the cathode. At least one of the fuel flow channel and the oxidant flow channel is formed so that it has a plurality of parallel linear portions whose central parts in a width direction thereof are to face the first linear regions.

The production method can further include the step of sandwiching the membrane electrode assembly between the anode-side separator and the cathode-side separator in such a manner that the first linear regions face the central parts of the linear portions in the width direction, to form a cell.

According to the invention, it is possible to produce a fuel cell having high output density and power generation efficiency at low costs.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
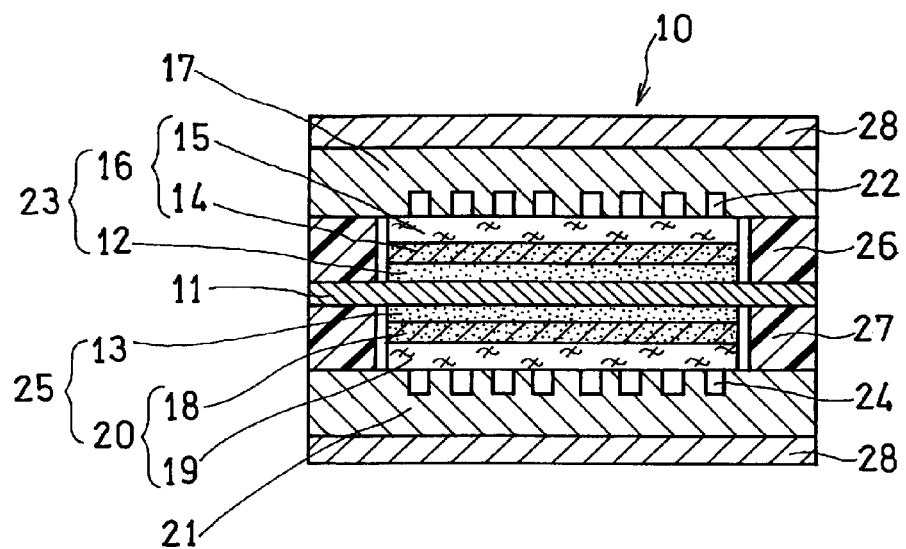
FIG. 1 is a longitudinal sectional view schematically showing an example of the structure of a polymer electrolyte fuel cell.

The polymer electrolyte fuel cell of the invention includes at least one cell that includes: a membrane electrode assembly including an anode, a cathode, and an electrolyte membrane disposed between the anode and the cathode, the anode including an anode catalyst layer containing an anode catalyst on one main surface of the electrolyte membrane and an anode diffusion layer laminated on the anode catalyst layer, the cathode including a cathode catalyst layer containing a cathode catalyst on the other main surface of the electrolyte membrane and a cathode diffusion layer laminated on the cathode catalyst layer; an anode-side separator having a surface with a fuel flow channel for supplying a fuel to the anode; and a cathode-side separator having a surface with an oxidant flow channel for supplying an oxidant to the cathode.

At least one of the fuel flow channel and the oxidant flow channel has a plurality of parallel linear portions. The intervals between the adjacent linear portions, i.e., the widths of the linear protruding portions of the separator, are preferably the same. When the flow channel has a plurality of parallel linear portions, at least one of the anode catalyst layer and the cathode catalyst layer has a plurality of belt-like first regions facing the plurality of linear portions and second regions between the adjacent first regions. The second regions face the surface (the linear protruding portions) of the separator between the adjacent linear portions. The second regions refer to regions in contact with the top faces of the protruding portions, and this holds true even when the groove is tapered from the opening toward the bottom in a cross-section perpendicular to the direction of the flow channel. The amount of catalyst in the first regions per unit (projected) area is on average larger than the amount of catalyst in the second regions per unit (projected) area. The value obtained by dividing the total amount of catalyst contained in all the first regions by the total projected area of all the first regions is higher than the value obtained by dividing the total amount of catalyst contained in all the second regions by the total projected area of all the second regions. As used herein, the term "projected area" refers to the area surrounded by the contour of the image of the catalyst layer or a part thereof orthogonally projected on the electrolyte membrane.

With this structure, the first regions facing the fuel flow channel or the oxidant flow channel contain a larger amount of catalyst. That is, due to the presence of the larger amount of catalyst in the first regions where the supply of fuel or oxidant and the removal of products are smooth, the three-phase interface can be effectively utilized. At the same time, it is possible to reduce the amount of catalyst contained in the second regions facing the protruding portions of the separator, where the supply of fuel or oxidant and the removal of products tend to be hampered. This facilitates the effective utilization of catalyst and allows a reduction in the total amount of catalyst necessary to form the catalyst layer, thereby making it possible to provide a fuel cell with high performance at low costs.

Also, with this structure, since the catalyst layer can be coated on the whole main surface of the electrolyte membrane, it is possible to suppress a decrease in the output density and fuel utilization rate of the fuel cell while reducing the total amount of catalyst used. It is thus possible to ensure high output density and power generation efficiency.

The invention is particularly effective when applied to direct oxidation fuel cells using a fuel such as methanol. Since the first regions facing the fuel flow channel, to which a large amount of fuel is supplied, have a large number of active sites, the invention is effective for reducing methanol crossover, which is a phenomenon of permeation of unreacted fuel through the electrolyte membrane. That is, the invention is also effective in improving the fuel utilization efficiency.

Embodiments of the invention are hereinafter described with reference to drawings.

[Fuel Cell]

A polymer electrolyte fuel cell such as a DMFC has, for example, the structure as illustrated in FIG. 1.

A fuel cell 10 of FIG. 1 includes an electrolyte membrane 11 and an anode 23 and a cathode 25 disposed so as to sandwich the electrolyte membrane 11. The anode 23 includes an anode catalyst layer 12 and an anode diffusion layer 16. The anode catalyst layer 12 is in contact with the electrolyte membrane 11. The anode diffusion layer 16 includes an anode microporous layer 14 and an anode porous substrate 15. The anode microporous layer 14 and the anode porous substrate 15 are laminated in this order on the face of the anode catalyst layer 12 opposite to the face in contact with the electrolyte membrane 11. An anode-side separator 17 is disposed in contact with the outer side of the anode diffusion layer 16.

The cathode 25 includes a cathode catalyst layer 13 and a cathode diffusion layer 20. The cathode catalyst layer 13 is in contact with the face of the electrolyte membrane 11 opposite to the face in contact with the anode catalyst layer 12. The cathode diffusion layer 20 includes a cathode microporous layer 18 and a cathode porous substrate 19. The cathode microporous layer 18 and the cathode porous substrate 19 are laminated in this order on the face of the cathode catalyst layer 13 opposite to the face in contact with the electrolyte membrane 11. A cathode-side separator 21 is disposed in contact with the outer side of the cathode diffusion layer 20.

The stack of the electrolyte membrane 11, the anode 23, the cathode 25, the anode-side separator 17, and the cathode-side separator 21 form a basic structure which is called a cell. It should be noted that the laminate of the electrolyte membrane 11 and the anode catalyst layer 12 and the cathode catalyst layer 13 sandwiching the electrolyte membrane 11 is the power generation area of the fuel cell which is called a CCM (Catalyst Coated Membrane). Also, the laminate of the CCM and the anode diffusion layer 16 and the cathode diffusion layer 20 is called a membrane electrode assembly (MEA). The anode diffusion layer 16 and the cathode diffusion layer 20 allow the supplied fuel and oxidant to be uniformly diffused and allow the products, i.e., water and carbon dioxide, to be smoothly removed.

A gasket 26 is fitted between the anode-side separator 17 and the electrolyte membrane 11 so as to seal the anode 23, while a gasket 27 is fitted between the cathode-side separator 21 and the electrolyte membrane 11 so as to seal the cathode 25. The gaskets 26 and 27 prevent the fuel and oxidant from leaking to outside, respectively.

A cell composed of the MEA sandwiched between the anode-side separator 17 and the cathode-side separator 21 may be used singly, but a plurality of cells may be stacked to form a stack. Such a stack with an end plate 28 disposed on the outer side of the separator at each end is clamped with bolts, springs, etc., which are not shown. A stack of cells may use a separator having a flow channel in both faces. In this case, one face of such a separator may be used as the anode-side separator 17, while the other face may be used as the cathode-side separator 21 of an adjacent cell. A cooling medium may be supplied to one of the flow channels in both faces.

[Separator]

The anode-side separator 17 has a fuel flow channel 22 for supplying a fuel to the MEA in the face in contact with the anode porous substrate 15. The fuel flow channel 22 comprises a groove that is open toward the anode diffusion layer 16.

The cathode-side separator 21 has an oxidant flow channel (air flow channel) 24 for supplying an oxidant (air) to the MEA in the face in contact with the cathode porous substrate 19. The oxidant flow channel 24 comprises a groove that is open toward the cathode diffusion layer 20.

The fuel flow channel and the oxidant flow channel have the function of supplying the fuel and oxidant uniformly in the plane direction of the MEA, while promptly removing water and carbon dioxide produced by the reaction. The portion other than the flow channel (protruding portion) functions as a conductive area where electron transfer is carried out with the diffusion layer.

In view of such functions, for example, when the MEA is quadrangular, the fuel flow channel and the oxidant flow channel have a structure such as: a structure composed of a plurality of parallel linear grooves and linear protruding portions therebetween, each of the linear grooves having an inlet on one side of the quadrangle and an outlet on the side parallel thereto; a structure composed of grid-like grooves and island-like protruding portions; a serpentine structure comprising a serpentine groove. The grooves of these structures often have linear portions between the inlet and the outlet, and the ratio of the linear portions of the groove(s) to the whole area of the separator facing the MEA is high. In terms of uniformly distributing the fuel or oxidant to the MEA, at least one of the fuel flow channel and the oxidant flow channel is preferably, but not limited to, a serpentine flow channel.

Figure 2:
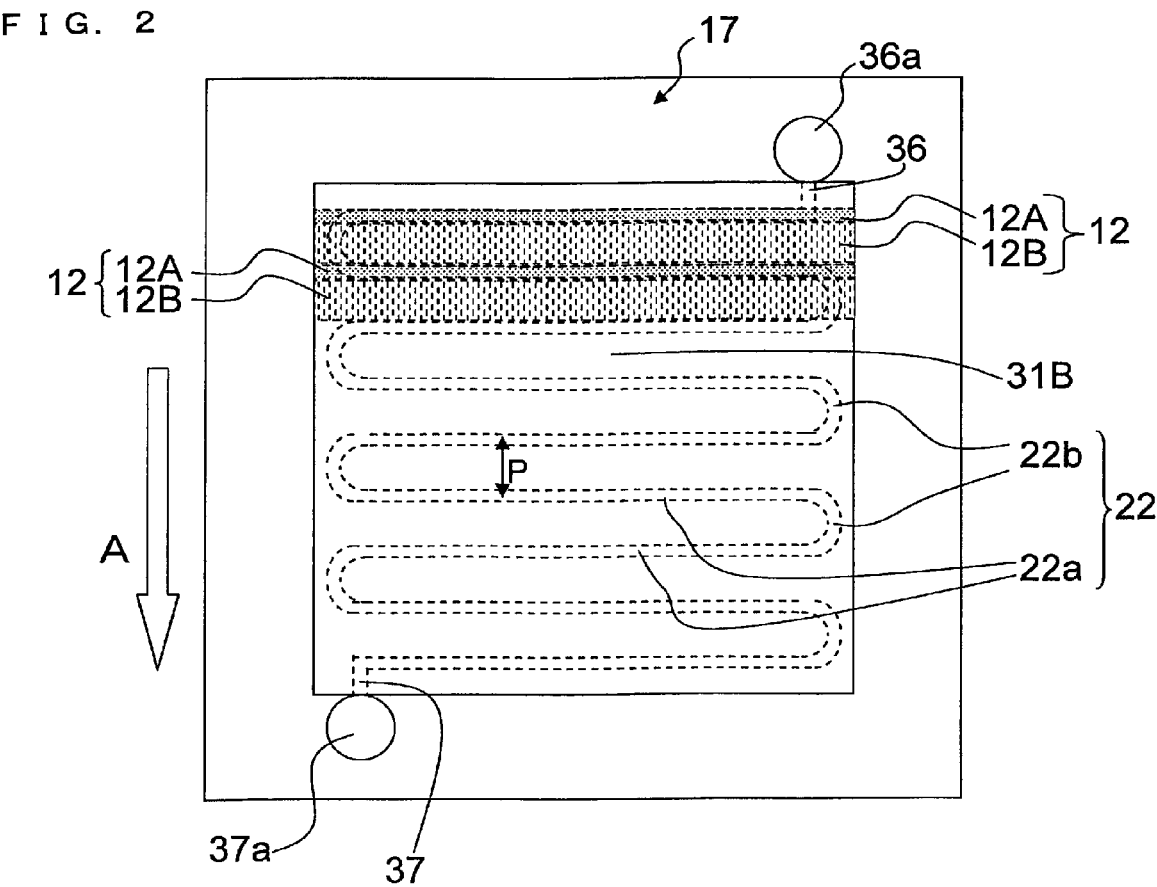
FIG. 2 is a plan view of the face of a separator having a flow channel included in a fuel cell in one embodiment of the invention.

FIG. 2 is a plan view of an example of a separator having a serpentine flow channel. On the assumption that the separator of FIG. 2 is the anode-side separator 17, the contour of the fuel flow channel 22 the anode catalyst layer 12 faces is shown by the dotted line. The fuel flow channel 22 serves to distribute the fuel in the plane direction parallel to the main surface of the electrolyte membrane 11. The fuel flow channel 22 is provided with at least a pair of a fuel inlet 36 and a fuel outlet 37. In FIG. 2, the anode-side separator 17 has one flow channel inlet 36 and one flow channel outlet 37 for the sake of simplicity. The flow channel inlet 36 and the flow channel outlet 37 communicate with manifold apertures 36a and 37a of the anode-side separator 17, respectively. The fuel is supplied from the manifold aperture 36a, flows in one direction (the direction of the arrow A) from the flow channel inlet 36 toward the flow channel outlet 37, and is discharged into the manifold aperture 37a. The form of the fuel flow channel and the oxidant flow channel is not limited to the form illustrated in FIG. 2.

The serpentine flow channel has a plurality of parallel linear grooves (linear portions 22a). The areas of the linear portions 22a are defined by linear protruding portions 31 of the separator. Also, a pair of the adjacent linear portions 22a is connected by a curved portion (U-shaped portion) 22b. The linear portions 22a of the flow channel face first regions 12A of the anode catalyst layer 12 where the amount of catalyst per unit area is relatively large, while the protruding portions 31 sandwiched between the linear portions 22a face second regions 12B where the amount of catalyst per unit area is smaller than that of the first regions 12A.

The dimensions of the flow channel formed in the anode-side or cathode-side separator are described below. In general, when the width of the groove is 0.5 to 2.5 mm or 0.5 to 2 mm, the fuel and oxidant are supplied smoothly, although it depends on the area of the electrode. If the width of the groove is too small, the cross-sectional area of the groove decreases. Thus, the friction resistance of the fluid increases, and the difference in pressure between the inlet and outlet of the flow channel increases. As a result, the energy necessary for driving pumps and other devices for supplying the fuel and oxidant increases, and the energy conversion efficiency of the whole fuel cell system lowers. On the other hand, if the width of the groove is too large, the adjacent diffusion layer becomes partially warped, and the diffusion layer tends to sag into the groove. As a result, the diffusion layer closes part of the cross-section of the flow channel, thereby interfering with the passage of the fuel or oxidant.

The depth of the groove is preferably 0.2 to 1 mm. If the depth of the groove is too small, the cross-sectional area decreases, in the same manner. If the depth of the groove is too large, the thickness of the separator increases, and the volume of the fuel cell stack increases. Generally, as the depth of the groove decreases, the flow rate of fuel or oxidant increases, so the amount of fuel or oxidant that diffuses into the electrolyte membrane decreases. Thus, the difference in the concentration of fuel or oxidant between the first regions of the catalyst layer facing the groove of the separator and the second regions facing the protruding portions of the separator increases, and the advantageous effects of the invention increase.

The dimensions of the linear protruding portions of the separator are determined in relation to the groove. Preferably, there is no significant difference between the width of the groove and the width of the protruding portions. The area of the top faces of the protruding portions of the separator facing the electrode preferably accounts for 40% to 80% of the projected area of the electrode (specifically the diffusion layer). That is, the area of the flow channel facing the electrode preferably accounts for 20% to 60% of the projected area of the electrode.

When the width of the linear protruding portions is 0.5 to 3 mm or 0.5 to 2.5 mm, good electronic conductivity is ensured. When the area of the top faces of the protruding portions increases, the area of the opening of the groove decreases. Thus, the area where the supply speed of fuel and oxidant is slow increases. As a result, the concentration overvoltage may increase and the power generation performance may deteriorate. On the other hand, if the area of the top faces of the protruding portions decreases, the contact area of the protruding portions and the diffusion layer decreases, and the resistance to electronic conductivity increases. As a result, the power generation performance may deteriorate. In consideration of the above, the total of the width of the groove and the width of the protruding portion is preferably 1 to 5 mm.

[Electrode]

The anode 23 has the anode catalyst layer 12 in contact with the electrolyte membrane 11 and the anode diffusion layer 16 in contact with the anode-side separator 17. The anode diffusion layer 16 has the anode microporous layer 14 in contact with the anode catalyst layer 12 and the anode porous substrate 15 in contact with the anode-side separator 17.

The cathode also has the same basic structure as that of the anode. The cathode 25 has the cathode catalyst layer 13 in contact with the electrolyte membrane 11 and the cathode diffusion layer 20 in contact with the cathode-side separator 21. The cathode diffusion layer 20 has the cathode microporous layer 18 in contact with the cathode catalyst layer 13 and the cathode porous substrate 19 in contact with the cathode-side separator 21.

Figure 3:
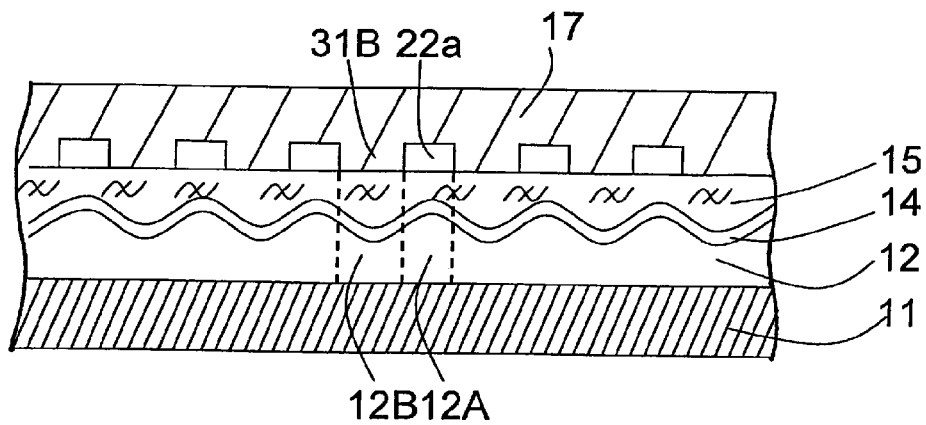
FIG. 3 is an enlarged sectional view of a main part of the fuel cell in one embodiment of the invention.

FIG. 3 shows a main part of the fuel cell in one embodiment of the invention, in which the structure of an electrode and the vicinity thereof is schematically illustrated. Although FIG. 3 illustrates the structure of the anode-side separator 17, the anode 23, and the electrolyte membrane 11, at least one of the anode side and the cathode side may have such a structure. In FIG. 3, the same constituent elements as those of FIG. 1 are given the same numbers.

In FIG. 3, the anode catalyst layer 12 formed on a surface of the electrolyte membrane 11 is composed of the first regions 12A with a relatively large average thickness and the second regions 12B with a relatively small average thickness.

The first regions 12A of the anode catalyst layer 12 face the linear portions 22a of the fuel flow channel 22 with the anode diffusion layer 16 interposed therebetween. Also, the second regions 12B of the anode catalyst layer 12 face the protruding portions 31 between the adjacent linear portions 22a with the anode diffusion layer 16 interposed therebetween.

However, when the fuel flow channel or oxidant flow channel formed in the separator is serpentine as illustrated in FIG. 2, part of the flow channel and the protruding portions in the curved portions do not face the first regions and the second regions, respectively. Even in such cases, it is preferable that 80% or more of the first regions face the linear portions of the flow channel. It is also preferable that the total ratio of the first regions and the second regions to the projected area of the catalyst layer be 70 to 100%.

Examples of the porous substrate used as the anode porous substrate 15 and the cathode porous substrate 19 include substrates made of conductive fibers such as carbon paper made of carbon fibers, carbon cloth, and carbon non-woven fabric (carbon felt), corrosion-resistant metal meshes, and foam metals. It is preferable to subject the anode porous substrate 15 to a water-repellent treatment. It is also preferable to subject the cathode porous substrate 19 to a water-repellent treatment.

The anode microporous layer 14 and the cathode microporous layer 18 need to have high water-repellency, good electronic conductivity, and pores for facilitating the movement of the fuel or oxidant. Examples of highly water-repellent materials include fluorocarbon polymers such as polytetrafluoroethylene (PTFE) and fluorinated graphite. Examples of conductive materials include carbon blacks (e.g., furnace black and acetylene black), graphite powders, and porous metal powders.

Preferably, there are no large gaps between the microporous layer and the catalyst layer. In the case of the cathode, in particular, the water produced in the catalyst layer needs to promptly reach the microporous layer, pass through the diffusion layer, and be discharged into the oxidant flow channel. However, if there are large gaps between the microporous layer and the catalyst layer, the water builds up in the gaps, thereby interfering with the removal of the water and the flow of air thereinto. As a result, the power generation performance may deteriorate. Therefore, it is preferable that the microporous layer conform to the surface roughness of the catalyst layer in such a manner that no gaps are formed between the microporous layer and the catalyst layer (i.e., both the first regions and the second regions).

A microporous layer can be formed on a catalyst layer without gaps therebetween by forming a mixture containing a resin such as PTFE and carbon black (raw materials of a microporous layer) on a surface of carbon paper, carbon cloth, carbon non-woven fabric, etc. In this case, the thickness of the microporous layer is preferably about 1 to 40 μm.

The anode catalyst layer 12 includes anode catalyst particles for promoting the reaction represented by the reaction formula (11) and a polymer electrolyte for providing ionic conductivity between the anode catalyst layer 12 and the electrolyte membrane 11.

The anode catalyst particles refer to a catalyst including metal element(s). The anode catalyst particles refer to, for example, a metal or metal compound having a catalytic activity, and such examples include metal simple substances, metal oxides, and alloys. More specifically, such examples include alloys of platinum (Pt) and ruthenium (Ru), mixtures of Pt and a ruthenium oxide, ternary alloys of Pt, Ru, and another metal element (e.g., iridium (Ir)), and platinum simple substance. In the case of a Pt—Ru alloy, the atomic ratio of Pt to Ru is preferably, but not limited to, 1:1. In particular, the anode catalyst particles preferably include at least one selected from platinum simple substance and alloys of platinum and ruthenium.

The cathode catalyst layer 13 includes cathode catalyst particles for promoting the reaction represented by the reaction formula (12) and a polymer electrolyte for providing ionic conductivity between the cathode catalyst layer 13 and the electrolyte membrane 11.

The cathode catalyst particles refer to a metal or metal compound having a catalytic activity, like the anode catalyst particles, and such examples include metal simple substances, metal oxides, and alloys. More specifically, such examples include Pt simple substance and Pt alloys. Examples of Pt alloys include alloys of Pt and a transition metal such as cobalt or iron.

Examples of the polymer electrolyte contained in the anode catalyst layer 12 and the cathode catalyst layer 13 include a perfluorosulfonic acid/polytetrafluoroethylene copolymer ($H^+$ type), sulfonated polyether sulfone ($H^+$ type), and aminated polyether sulfone ($OH^-$ type).

In terms of increasing the active sites of the catalyst particles and heighten the reaction speed, it is preferable to make the size of the anode catalyst particles and the cathode catalyst particles as small as possible for use. The mean particle size of the catalyst particles is usually in the range of 1 to 20 nm. However, pulverized catalyst particles (hereinafter referred to as unsupported catalyst fine particles) tend to agglomerate to form agglomerates. Even when the primary particles of catalyst particles are small, the secondary particles (agglomerates) are several tens of times as large as the primary particles. Thus, the active surface area of the catalyst particles, which affects the reaction speed, does not become large enough. It is thus common for unsupported catalyst fine particles to be supported on a surface of a support with a sufficient large surface area, such as conductive carbon particles, to ensure sufficient active surface area.

The actual active sites of the anode catalyst particles are present on the surface of, for example, platinum and ruthenium particles. Also, the actual active sites of the catalyst particles are present on the surface of, for example, platinum particles. In the invention, the amount of catalyst per unit area refers to the net amount of catalyst excluding the support, and is the sum of the amounts of, for example, platinum and ruthenium (in the case of the anode catalyst layer) per unit area.

An example of the conductive carbon particles is carbon black. The mean particle size of the conductive carbon particles is preferably 5 to 50 nm in terms of the balance with the size of the catalyst particles.

The ratio of the mass of the catalyst particles to the total mass of the catalyst particles and the conductive carbon particles is hereinafter referred to as the support ratio. The support ratio of the catalyst particles is preferably 50 to 99%. The density of the catalyst particles is significantly higher than that of the conductive carbon particles used in the catalyst layers of conventional fuel cells. Thus, as the support ratio of the supported catalyst is heightened, the packing density of the catalyst particles can be heightened.

It should be noted that the cathode catalyst particles (e.g., Pt simple substance or a Pt alloy) are often used in the form of a Pt fine powder or a Pt alloy fine powder without being supported on conductive carbon particles such as carbon black.

In the anode catalyst layer 12 and/or the cathode catalyst layer 13, the amount of catalyst in the first regions per unit area is larger than the amount of catalyst in the second regions per unit area. However, considering that the first regions and the second regions are alternately arranged and adjacent to one another, it is preferable that the amount of catalyst gradually change from the first regions toward the second regions, rather than the amount of catalyst changing sharply at the borders (joint) between the first and second regions. For example, the amounts of catalyst on both sides of the border per unit area are preferably equal.

In the first regions, the amount of catalyst is preferably smallest at the ends, i.e., at the portions in contact with the second regions. The first regions preferably have such a catalyst distribution that the amount of catalyst gradually increases toward the center of each first region, reaches a maximum at the center, and then decreases. The second regions preferably have such a catalyst distribution that the amount of catalyst is largest at the ends, i.e., at the portions in contact with the first regions, gradually decreases toward the center of each second region, reaches a minimum at the center, and then increases.

The fuel or oxidant supplied to the fuel flow channel 22 or the oxidant flow channel 24 moves from the flow channel toward the anode catalyst layer 12 or the cathode catalyst layer 13 in parallel with the axis penetrating the MEA by molecular diffusion caused mainly by the difference in concentration. Also, the fuel or oxidant also moves in the plane direction parallel to the catalyst layer, i.e., from the portions facing the flow channel toward the electrode portions facing the protruding portions. Thus, an examination of the distribution of fuel concentration in the catalyst layer shows that the concentration is highest in the portions of the catalyst layer facing the central part of the flow channel and is lowest at the portions of the catalyst layer facing the central parts of the protruding portions.

To maximize the advantageous effects of the invention, it is preferable that the amount of catalyst be largest at the portions where the concentration of fuel or oxidant is highest and that the amount of catalyst be smallest at the portions where the concentration of fuel or oxidant is lowest. That is, the portion of each first region in which the amount of catalyst per unit area is largest preferably faces the central part of each linear portion of the flow channel in the width direction. Also, the portion of each second region in which the amount of catalyst per unit area is smallest preferably faces the central part of each linear protruding portion 31 in the width direction.

Generally, the porosity or density of the catalyst layer is preferably uniform in the plane of the electrode, although it depends on the production process of the catalyst layer or the operating conditions. Thus, the amount of catalyst is preferably almost proportional to the thickness of the catalyst layer. As such, in a cross-section of the catalyst layer, the average thickness of the first regions 12A is greater than that of the second regions 12B, as illustrated in FIG. 3.

The amount of catalyst per unit (projected) area can be measured, for example, as follows.

First, a predetermined region (e.g., a first region) of the catalyst layer is scraped off. The dimensions of the scraped sample are accurately measured with an optical microscope or the like, and the projected area is calculated. The sample is then dissolved in aqua regia to filtrate undissolved matter. The resultant filtrate is mixed with water to form a solution of predetermined amount (e.g., 100 ml). The amount of catalyst particles contained in the solution of predetermined amount is measured with an inductively coupled plasma-atomic emission spectrometer (ICP-AES: e.g., iCAP 6300 available from Thermo Fisher Scientific Inc.). Using the measured value and the projected area of the predetermined region, the amount of catalyst in the predetermined region of the catalyst layer per unit area can be determined.

The largest amount of catalyst in the first regions per unit area is preferably 1.1 to 2 times, and more preferably 1.1 to 1.5 times the smallest amount of catalyst in the second regions per unit area. In this range, the invention is sufficiently effective.

In this case, in the anode catalyst layer, the average amount of catalyst in the first regions per unit area is preferably 0.1 to 10 mg/cm$^2$ and, in the case of direct oxidation fuel cells, it is preferably 1 to 10 mg/cm$^2$. It should be noted that non-destructive testing utilizing a fluorescent X ray enables a measurement of the amount of catalyst in an area of several tens of μm$^2$. In the case of scraping a predetermined region of the catalyst layer, as described above, if the scraped area is 1 mm$^2$ or more, the amount of catalyst contained therein can be measured.

Also, in the cathode catalyst layer, the average amount of catalyst in the first regions per unit area is preferably 0.1 to 1.8 mg/cm$^2$ and, in the case of direct oxidation fuel cells, it is preferably 0.5 to 1.8 mg/cm$^2$.

The width of the first regions of the catalyst layer corresponds to the width of the linear portions of the fuel flow channel or oxidant flow channel. Also, the width of the second regions corresponds to the width of the protruding portions sandwiched between the linear portions of the flow channel. Thus, the width of each of the first regions and the second regions of the catalyst layer is preferably, for example, 0.5 to 2.5 mm. As a result, the total width of a pair of the first and second regions is preferably 1 to 5 mm.

In the anode catalyst layer, the average thickness of the first regions is greater than that of the second regions, as described above, and it is preferably, for example, 1 to 170 μm. In particular, in the case of direct oxidation fuel cells, the average thickness of the first regions 12A is preferably 20 to 170 μm.

In the cathode catalyst layer, also, the average thickness of the first regions is greater than that of the second regions, and it is preferably, for example, 1 to 50 μm. In particular, in the case of direct oxidation fuel cells, it is preferably 10 to 50 μm.

[Method for Forming Catalyst Layer and CCM]

The method for forming a catalyst layer according to the invention is described below. The anode catalyst layer 12 or the cathode catalyst layer 13 can be produced, for example, as follows.

(I) First, a catalyst ink containing a catalyst powder, an electrolyte, and a dispersion medium is prepared. Specifically, catalyst particles, or a supported catalyst comprising catalyst particles supported on a support such as conductive carbon particles, and a polymer electrolyte are dispersed in a suitable dispersion medium.

(II) Subsequently, the catalyst ink is applied onto the electrolyte membrane 11 and dried to form a catalyst layer. Examples of application methods include spraying, squeegee application, screen printing, and roll transfer. Among them, it is preferable to use a method using a spray coater (spray method) to spray a catalyst ink onto a surface of an electrolyte membrane or a substrate.

The electrolyte membrane sprayed with the catalyst ink can be an ion-conductive membrane and is not particularly limited. As the materials of the electrolyte membrane, for example, various polymer electrolytes known in the field of fuel cells can be used. Most of the currently available electrolyte membranes are of the proton-conductive type.

The preferable polymer electrolyte is, for example, a fluorocarbon polymer. The fluorocarbon polymer is preferably a perfluorosulfonic acid polymer, and such examples include a copolymer (H$^+$ type) of perfluorosulfonic acid and polytetrafluoroethylene. An example of such an electrolyte membrane including a perfluorosulfonic acid polymer is a Nafion membrane (trade name "Nafion®", available from E.I. Dupont de Nemours and Company).

The electrolyte membrane preferably has the effect of reducing the crossover of a fuel such as methanol used in fuel cells. Examples of electrolyte membranes having such an effect include the above-mentioned fluorocarbon polymer membranes, membranes comprising a fluorine-free hydrocarbon polymer such as sulfonated polyether ether sulfone (S-PEEK), and composite membranes comprising inorganic and organic materials.

In the case of spraying the catalyst ink directly on the electrolyte membrane as described above, this operation produces a CCM. However, in the case of spraying the catalyst ink on a substrate other than the electrolyte membrane, it is necessary to transfer the catalyst layer from the substrate to the electrolyte membrane in order to obtain a CCM. An example of the substrate other than the electrolyte membrane to be sprayed with the catalyst ink is a resin sheet. In this case, by laminating a resin sheet with a catalyst layer formed on a surface and the electrolyte membrane in such a manner that the catalyst layer faces the electrolyte membrane and hot pressing them, the catalyst layer can be transferred to the electrolyte membrane. The anode catalyst layer is transferred to one face of the electrolyte membrane, and the cathode catalyst layer is transferred to the other face. In this case, the anode catalyst layer and the cathode catalyst layer can be transferred to the electrolyte membrane simultaneously. Alternatively, it is also possible to transfer one of the catalyst layers and then transfer the other catalyst layer. Also, it is possible to spray the catalyst ink on the microporous layer of the diffusion layer to form a catalyst layer and then bond the diffusion layer and the electrolyte membrane to form a CCM and a membrane electrode assembly simultaneously.

Next, the spray method is described.

(a) First, a spray coater having a spray nozzle is prepared. The spray nozzle is capable of moving in the directions of an X axis and a Y axis which are orthogonal to each other and capable of spraying the ink on an X-Y plane having the X axis and the Y axis. The axis of the spray nozzle when it sprays the ink is set so that it is perpendicular to each of the X axis and the Y axis.

(b) Subsequently, an electrolyte membrane or a substrate is prepared, and the electrolyte membrane or the substrate is placed in parallel with the X-Y plane within an area in which the spray nozzle of the spray coater is capable of moving. In the case of applying the catalyst ink directly onto an electrolyte membrane to form a catalyst layer, the electrolyte membrane is placed in parallel with the X-Y plane. In the case of applying the catalyst ink onto a substrate other than an electrolyte membrane to form a catalyst layer and then transferring the catalyst layer onto the electrolyte membrane, the substrate is placed in parallel with the X-Y plane.

(c) Thereafter, the ink is sprayed on the X-Y plane from the spray nozzle while the spray nozzle is being moved in the direction of the X axis in an area between a straight line X=X0 and a straight line X=X0+L, to form a plurality of belt-like catalyst layers on a surface of the electrolyte membrane or the substrate along a plurality of straight lines $Y=Y_0+n\Delta Y$ where $n=0, 1, 2, \ldots m$, and m is an integer of 1 or more.

The belt-like catalyst layers include first linear regions along the straight lines $Y=Y_0+n\Delta Y$ and second linear regions along straight lines $Y=Y_0+(2N-1)\times\Delta Y/2$ where $N=1, 2, \ldots M$, M is an integer of 1 or more, and $\Delta Y$ is selected so that the amount of catalyst in the first linear regions per unit area is not less than 1.1 times and not more than twice the amount of catalyst in the second linear regions per unit area. $\Delta Y$ can be determined in consideration of the amount of ink sprayed from the spray nozzle per unit time, the speed at which the spray nozzle is moved in the direction of the X axis, etc.

After the Lth belt-like catalyst layer is formed as described above, the spray nozzle is moved, for example, in the direction of the Y axis for a predetermined distance. Then, while the spray nozzle is being moved along the X axis in the direction opposite to that for the Lth catalyst layer, the ink is sprayed from the spray nozzle to form the L+1th belt-like catalyst layer. By repeating a series of such steps a plurality of times, it is possible to easily form an anode catalyst layer or a cathode catalyst layer in which first regions and second regions are alternately arranged in parallel.

Figure 4:
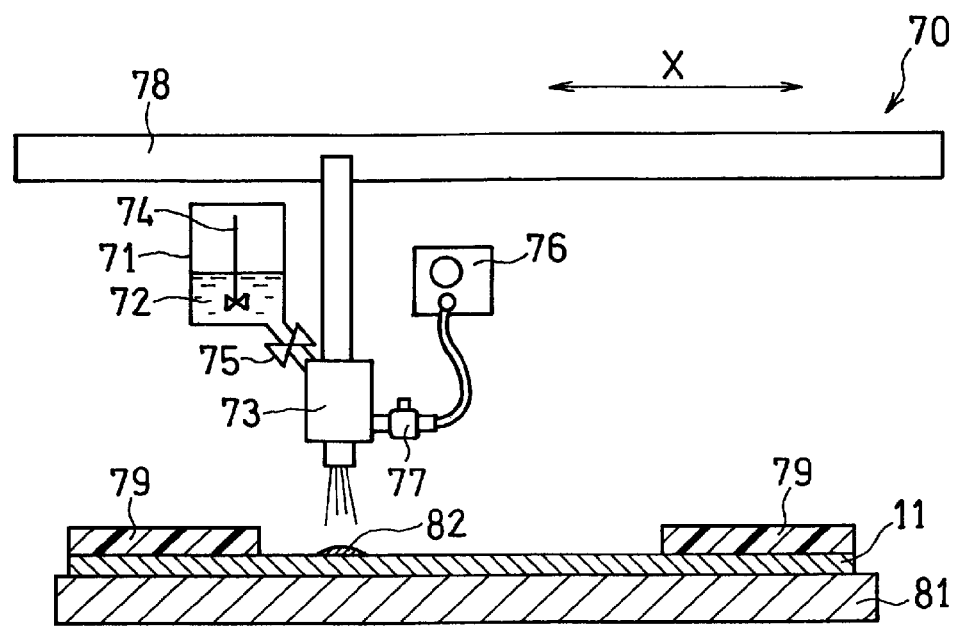
FIG. 4 is a schematic view showing an example of the structure of a spray coater used to form a catalyst layer.

FIG. 4 schematically illustrates the structure of an example of the spray coater. A spray coater 70 includes a tank 71 containing a catalyst ink 72 and a spray gun 73 for spraying an ink 72. The tank 71 is equipped with a stirrer 74 for stirring the ink 72 contained therein, and the ink 72 is constantly stirred. The ink 72 is fed to the spray gun 73 through an open/close valve 75 and is sprayed from the spray gun 73 together with a spray gas. The spray gas is fed to the spray gun 73 through a gas pressure adjustor 76 and a gas flow rate adjustor 77. Examples of the spray gas include nitrogen gas, air, and argon.

Every time a belt-like catalyst layer is formed, it is preferable to dry the belt-like catalyst layer. That is, it is preferable to form the L+1th belt-like catalyst layer after drying the Lth belt-like catalyst layer. In the spray coater 70, the surface temperature of the electrolyte membrane 11 or substrate (hereinafter referred to as work 11) is controlled by a heater 81 installed so as to contact the electrolyte membrane or substrate. The work 11 is secured to the heater 81 by a mask 79 having an opening corresponding to the projected image of the catalyst layer. The use of such a heater makes it easy to form the L+1th belt-like catalyst layer after drying the Lth belt-like catalyst layer. As a result, swelling of the electrolyte membrane with the dispersion medium contained in the ink is suppressed, and deformation of the electrolyte membrane or agglomeration of the catalyst particles is unlikely to occur.

The spray gun 73 can be moved by an actuator 78 at a desired speed from a desired position in two directions: the X axis parallel to the arrow X and the Y axis perpendicular to the plane of the paper of FIG. 4 and the X axis. The actuator 78 moves the spray gun 73 by means of a controller (not shown) based on a predetermined program of the coordinates (trail) of the movement and the moving speed.

The outlet (spray nozzle) of the spray gun 73 is usually circular or oval, and the ink is sprayed with the center of the outlet being the spray axis. While the dispersion medium of the sprayed ink is evaporating, the ink attaches to the surface of the electrolyte membrane or substrate, where it is dried. In this manner, a catalyst layer with a porous structure is formed.

Actually, most of the ink sprayed from the outlet does not move only along the central axis of the outlet, but moves toward the work 11 while diffusing in the direction perpendicular to the central axis. This is because the spray pressure is largest in the vicinity of the outlet and decreases toward outside, causing a pressure gradient. Thus, the concentration of the ink in the volume of the space is usually highest at the central axis of the outlet and gradually lowers toward outside. As a result, the amount of catalyst applied onto the surface of the work 11 per unit time is largest at the central axis of the outlet and concentrically decreases.

Figure 5:
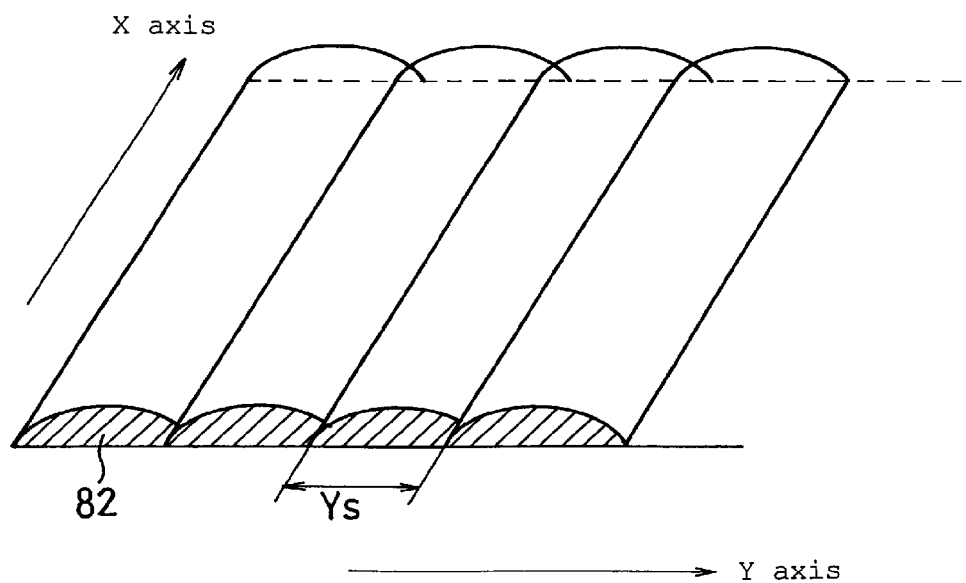
FIG. 5 is a schematic perspective view showing the catalyst amount distribution profile of a catalyst layer according to the invention.

As described above, since the amount of catalyst is largest at the central axis of the outlet and concentrically decreases, a cross-sectional profile 82 of the catalyst layer (the amount of catalyst) along the Y axis is shaped like a dome as illustrated in FIG. 5.

By moving the spray gun 73 linearly along the direction of the X axis, a coating with a dome-shaped sectional profile is continuously formed to form a belt-like catalyst layer. The distribution of the catalyst is such that the amount of catalyst is largest at the center of the belt and smallest at the long sides of the belt, as illustrated in FIG. 5. Every time the formation of one belt-like catalyst layer is completed, the position of the spray gun 73 or work 11 is moved in the direction of the Y axis by Ys ($\Delta Y$) (the amount of shift) to form another belt-like catalyst layer. By repeating this, a catalyst layer can be formed on the whole surface of the work 11.

The amount of catalyst often exhibits a normal distribution centered on the central axis of the outlet. In the case of using a spray gun exhibiting such a catalyst amount distribution profile, it is common in conventional art to move the spray gun or the work to make the amount of catalyst uniform on the plane of the work, in order to form a planar catalyst layer. It has been believed preferable for the catalyst layer for a fuel cell to have a uniform catalyst content and a uniform thickness. Therefore, it is common to laminate a plurality of belt-like catalyst layers having a dome-shaped cross-section to form a catalyst layer having a uniform catalyst content and a uniform thickness. That is, in conventional art, the shift amount Ys ($\Delta Y$) of the application position to the direction of the Y axis is made smaller than the width of each belt-like catalyst layer so that the edge portions of the adjacent belt-like catalyst layers containing small amounts of catalyst overlap, in order to make the catalyst amount distribution uniform in the direction of the Y axis.

Figure 6:
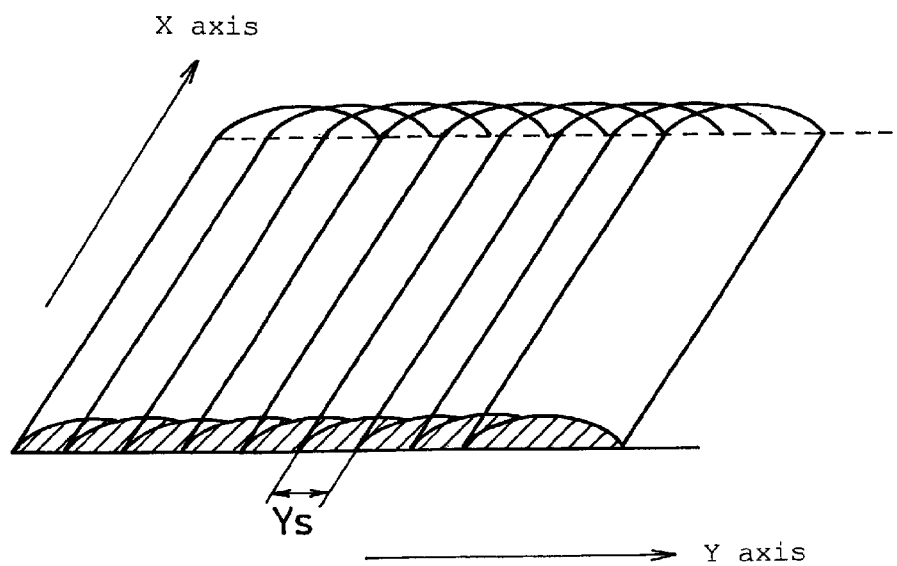
FIG. 6 is a schematic perspective view showing the catalyst amount distribution profile of a conventional catalyst layer.

The catalyst amount distribution of one belt-like catalyst layer along the direction of the Y axis, i.e., the shape of the dome-shaped cross-sectional profile 82, changes with various parameters such as the type of the spray gun, the spray conditions, and the physical properties of the ink. Thus, the number S of shifts of the application position to the direction of the Y axis changes depending on these conditions. However, generally, when Ys ($\Delta Y$) is 1 mm or less, it is possible to form a uniform catalyst layer having a less than 10% variation in the amount of catalyst per unit area. FIG. 6 is a schematic diagram showing the distribution of the amount of catalyst in such a catalyst layer along the direction of the X axis and the direction of the Y axis. The length W of the whole catalyst layer in the direction of the Y axis and the number S of shifts to the direction of the Y axis generally have a relation represented by the following formula (A).

$$S=W/Y_s+1 \tag{A}$$

The invention can decrease the number S of shifts. That is, as illustrated in FIG. 5, the distribution of the amount of catalyst in the direction of the Y axis is uneven, but the central part of each belt where the amount of catalyst is large can be utilized as the central part of each first region in the width direction, while the two long sides of the belt where the amount of catalyst is small can be utilized as the central part of each second region in the width direction. This eliminates the need to laminate a plurality of belt-like catalyst layers in such a manner that the distribution of the amount of catalyst is uniform. As a result, the time necessary to form a catalyst layer can be reduced, and a CCM or an MEA can be produced at low costs.

When the shift of the application position to the direction of the Y axis is made S times, but the amount of catalyst has not reached a necessary level, it is necessary to trace the same path one or more times to reapply the catalyst ink to laminate belt-like catalyst layers (the number of coating layers laminated in this manner is hereinafter represented by Z). The number L of times the spray gun sprays the ink while moving in the direction of the X axis above the work is the product of $(S+1)$ and Z $(L=(S+1)\times Z)$. As the value of L lowers, the time necessary to spray the ink is shortened, so the costs for producing the catalyst layer are reduced.

By increasing the amount of ink sprayed from the spray gun, it is possible to increase the amount of catalyst contained in one belt-like catalyst layer and reduce the production costs. However, if the amount of sprayed ink is increased, the wet ink is present on the work for a long time. Hence, the electrolyte membrane may absorb the dispersion medium contained in the ink, thereby becoming swollen or deformed, or the catalyst particles may agglomerate. In such cases, the catalyst layer may become cracked, or the power generation performance may deteriorate. Therefore, the number Z of laminated layers is preferably 1 to 30, and more preferably 3 to 10.

The method using a spray gun has been described, but the spray coater is not limited to the one described above, and, for example, an air brush may be used. Also, the method for forming the catalyst layer is not limited to the spray method described above, and, for example, a squeegee method may be used. In this case, by making the shape of the squeegee blade for the ink, for example, wavy, the shape of the gap between the work and the blade can also be made wavy. If the ink is squeegeed through such a wavy gap, first regions are formed in the protruding portions of the gap, and second regions are formed in the depressed portions of the gap.

[Method for Forming Membrane Electrode Assembly]

A membrane electrode assembly can be formed by bonding a CCM and diffusion layers. Specifically, a laminate (CCM) of an anode catalyst layer, an electrolyte membrane, and a cathode catalyst layer is sandwiched between an anode diffusion layer and a cathode diffusion layer, followed by hot pressing. At this time, the anode diffusion layer is bonded to the anode catalyst layer, while the cathode diffusion layer is bonded to the cathode catalyst layer. In this manner, a membrane electrode assembly (MEA) comprising a laminate of the anode, the electrolyte membrane, and the cathode is produced.

Also, in the case of forming an anode catalyst layer and a cathode catalyst layer on the surfaces of an anode diffusion layer and a cathode diffusion layer, respectively, an electrolyte membrane is sandwiched between an anode and a cathode, followed by hot pressing, to form a membrane electrode assembly. In this case, the anode and the cathode are formed so that the anode catalyst layer is in contact with the anode microporous layer, while the cathode catalyst layer is in contact with the cathode microporous layer.

A microporous layer can be formed by applying an ink containing conductive particles and a water-repellent resin onto a substrate with a porous structure and drying it. The conductive particles can be a material capable of forming a porous structure such as carbon black. The water-repellent resin can be a fluorocarbon polymer or the like. The ink can be prepared by mixing conductive particles, a water-repellent resin, and a suitable dispersion medium and stirring them. It is preferable to apply a water-repellent treatment to the substrate in advance. The material of the substrate is preferably conductive fibers, and examples include carbon cloth and carbon paper. Examples of the method for applying the ink include screen printing and squeegee application.

The porosities of the first regions and the second regions of the catalyst layer are thought to be almost the same when the catalyst layer is formed, but the thicknesses of the first regions and the second regions are different. Thus, in the hot pressing step, a larger pressure is applied to the thick first regions, and pressure is unlikely to be applied to the thin second regions. As a result, after the catalyst layer is hot pressed, the porosity of the first regions tends to become lower than that of the second regions. There is a concern that a decrease in porosity may result in poor diffusion of fuel or oxidant, but such concern is negligible since the first regions face the fuel flow channel and the oxidant flow channel. That is, the density of the first regions in the MEA may be higher than that of the second regions. However, it is preferable to adjust the pressure for hot pressing so that there is no significant difference in the porosities of the first and second regions.

The density of the catalyst layer is expressed as the mass of the solid contents in the catalyst layer per unit volume, and can be determined as follows. First, the catalyst layer is cut to a predetermined size, and the area and the thickness thereof are measured to calculate the volume. Then, the mass of the cut catalyst layer is measured. In the measurement of the mass, an electrobalance or the like may be used, or an atomic absorption spectroscopy capable of mass measurement may be used. It is preferable to measure the mass after removing the moisture contained in the catalyst layer. Using the mass and the volume obtained in this manner, the density of the catalyst layer can be determined.

[Formation of Cell]

The MEA is sandwiched between an anode-side separator and a cathode-side separator to form a cell for a fuel cell. At this time, the anode-side separator is disposed on the anode side of the MEA, while the cathode-side separator is disposed on the cathode side of the MEA.

Each of the anode-side separator and the cathode-side separator is made of, for example, a carbon material such as graphite. The face of the anode-side separator in contact with the anode has a fuel flow channel for supplying a fuel (e.g., aqueous methanol solution) to the anode. The face of the cathode-side separator in contact with the cathode has an oxidant flow channel for supplying an oxidant (e.g., air or oxygen) to the cathode. At least one of the fuel flow channel and the oxidant flow channel has a plurality of linear portions so that the central portions in the width direction face the first linear regions of the catalyst layer corresponding to a plurality of straight lines $Y=Y0+n\Delta Y$. The membrane electrode assembly is sandwiched between the anode-side separator and the cathode-side separator so that the first linear regions face the central parts of the linear portions in the width direction, to form a cell.

The fuel flow channel of the anode-side separator and the oxidant flow channel of the cathode-side separator can be formed, for example, by cutting a groove in a surface of a separator material. Also, a separator material can be injection molded or compression molded so that it has a fuel flow channel or an oxidant flow channel.

It is important to make the pitch of the flow channel almost equal to the pitch of the first regions of the catalyst layer. For example, the pitch P of the flow channel in FIG. 2 and the shift amount Ys ($\Delta Y$) for forming the belt-like catalyst layers in FIG. 5 can be made equal. With this structure, the first regions face the flow channel, while the second regions face the protruding portions of the separator. In the assembly of a fuel cell, the MEA and the respective separators are disposed so that the first regions face the flow channel, and their positions are fixed.

As illustrated in FIG. 1, the outer dimensions of the electrolyte membrane 11 in the plane direction are larger than those of the anode catalyst layer 12 and the cathode catalyst layer 13. Thus, the peripheral portion of the electrolyte membrane 11 not in contact with the catalyst layers can be provided with locating through-holes. The corresponding positions of the separators are also provided with locating through-holes. In fabricating a cell, pins are inserted through the locating through-holes to dispose the separators in contact with the MEA. This readily allows the first regions to face the flow channel. Alternatively, gaskets described below are fixed to the separators, and the catalyst layers and the diffusion layers are fitted to the openings of the gaskets. This also allows the first regions to face the flow channel.

Examples of materials of the gaskets 26 and 27 include fluorocarbon polymers such as polytetrafluoroethylene (PTFE) and tetrafluoroethylene-hexafluoropropylene copolymer (FEP), synthetic rubbers such as fluorocarbon rubber and ethylene-propylene-diene rubber (EPDM), and silicone elastomers.

Each of the gaskets is shaped like a sheet. The central part of the gasket has an opening for receiving the membrane electrode assembly (MEA), and the opening has the same area as that of the MEA. The gaskets 26 and 27 are fitted to the peripheral portions of the electrolyte membrane 11 of the MEA so that they are in contact with the side faces of the anode catalyst layer 12 and the cathode catalyst layer 13. The gaskets 26 and 27 serve to press the electrolyte membrane 11 in the thickness direction together with the anode-side separator 17 and the cathode-side separator 21, respectively.

A cell is composed of the MEA and the anode-side separator 17 and the cathode-side separator 21 disposed on both sides of MEA. The cell sandwiched between two end plates 28 is clamped with bolts, springs, etc., which are not shown. The two end plates 28 are disposed on the anode-side separator 17 and the cathode-side separator 21, respectively. A plurality of cells may be stacked to form a cell stack. In this case, the cell stack is also clamped with end plates, bolts, springs, etc.

The interface between the MEA and the separators has poor adhesion. However, by clamping the cell as described above, it is possible to increase the adhesion between the MEA and the separators and consequently reduce the contact resistance between the MEA and the separators.

The above description has been made mainly in connection with DMFCs which use methanol as the fuel, but the fuel cell is not limited to a DMFC. However, the invention is particularly effective when applied to direct oxidation fuel cells using a fuel that has high affinity for water and is liquid at room temperature.

When the invention is applied to direct oxidation fuel cells, it is possible to use hydrocarbon liquid fuels such as ethanol, dimethyl ether, formic acid, and ethylene glycol as well as methanol. It is preferable to use these fuels as an aqueous solution with a concentration of 1 mol/L to 8 mol/L. The methanol concentration of the aqueous methanol solution is more preferably 3 mol/L to 5 mol/L. As the fuel concentration becomes higher, the whole fuel cell system can become more compact and more light-weight, but MCO may increase. According to the invention, since MCO can be reduced, an aqueous methanol solution with a higher methanol concentration than conventional concentrations can be used. If the methanol concentration is lower than 1 mol/L, it may be difficult to make the fuel cell system compact and light-weight. If the methanol concentration is higher than 8 mol/L, MCO may not be reduced sufficiently.

Air at normal temperature and humidity can be used as the air serving as the oxidant. Part of the water supplied to the anode moves from the anode to the cathode together with the movement of protons by electroosmosis. At the cathode, water is produced. There is thus no need to humidify the supply air by using a humidifier or the like, and the electrolyte membrane and the electrolyte contained in the catalyst layers are impregnated with sufficient water, exhibiting good proton conductivity.

The invention is hereinafter described specifically by way of Examples and Comparative Examples, but the invention is not to be construed as being limited to the Examples.

Example 1

A supported anode catalyst comprising anode catalyst particles supported on a support was prepared. A platinum-ruthenium alloy (atomic ratio 1:1) (mean particle size: 5 nm) was used as the anode catalyst particles. Conductive carbon particles with a mean primary particle size of 30 nm were used as the support. The weight of the platinum-ruthenium alloy was set to 80% by weight of the total weight of the platinum-ruthenium alloy and the conductive carbon particles.

A supported cathode catalyst comprising cathode catalyst particles supported on a support was prepared. Platinum (mean particle size: 3 nm) was used as the cathode catalyst particles. Conductive carbon particles with a mean primary particle size of 30 nm were used as the support. The weight of platinum was set to 80% by weight of the total weight of the platinum and the conductive carbon particles.

A 50-μm thick fluorocarbon polymer membrane (a film composed basically of a perfluorosulfonic acid/polytetrafluoroethylene copolymer ($H^+$ type), trade name "Nation® 112", available from E.I. Du Pont de Nemours & Co. Inc.) was used as the polymer electrolyte membrane.

(a) Preparation of CCM
(i) Formation of Anode 10 g of the supported anode catalyst, 70 g of a liquid dispersion containing a perfluorosulfonic acid/polytetrafluoroethylene copolymer ($H^+$ type) (trade name: "Nation® 5 wt % solution", available from E.I. Du Pont de Nemours & Co. Inc. of the United States), and a suitable amount of water were stirred and mixed with a stirring device. The resultant mixture was defoamed to prepare an ink for forming an anode catalyst layer.

The anode-catalyst-layer forming ink was sprayed onto a surface of the polymer electrolyte membrane by a spray method using an air brush, to form a 10-cm square anode catalyst layer. The dimensions of the anode catalyst layer were adjusted by masking.

Specifically, a 12-cm square electrolyte membrane was fixed to a porous metal plate by reducing the pressure and adsorbing the electrolyte membrane onto the porous metal plate. The surface temperature of the porous metal plate was adjusted to 70° C. by using a heater. A window-frame-shaped, polyethylene terephthalate (PET) mask having an outer shape of a 15-cm square and a 10-cm square central opening was disposed on the electrolyte membrane, and fixed thereto by pressure reduction and adsorption in the same manner as described above.

The air brush was fixed to a linear robot capable of moving in the directions of an X axis and a Y axis which were orthogonal to each other. The linear robot was connected to a personal computer storing a predetermined program so that it was capable of moving along the programmed path. The amount of ink sprayed was adjusted by adjusting the degree of opening of nozzle of the air brush. The degree of opening was set so that the width of the applied ink was approximately 6 mm.

The path of the air brush was set as follows. On the X-Y plane above which the nozzle of the air brush was capable of moving, the origin of the coordinate axes was set to the bottom-left vertex of the 12-cm square electrolyte membrane. Hereinafter, coordinates are expressed as (X, Y) in the unit mm.

Figure 7:
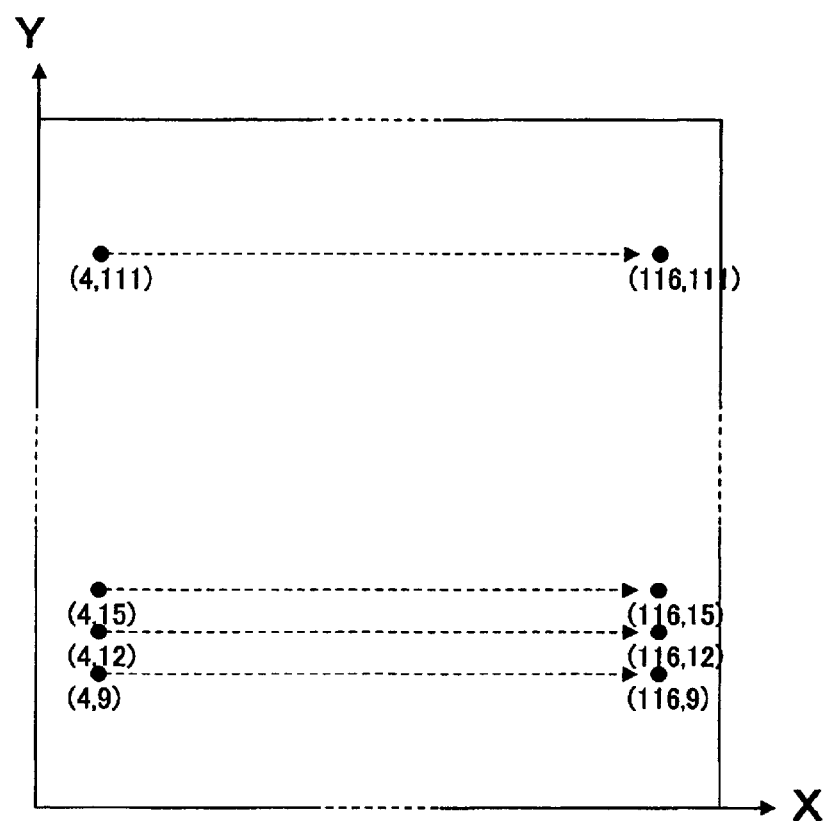
FIG. 7 shows an application pattern of a catalyst ink used to form an anode catalyst layer according to an Example of the invention.

First, as shown in FIG. 7, while the nozzle was moved from the coordinate (4, 9) to the coordinate (116, 9) in the direction of the X axis, the ink was continuously sprayed to form the first belt-like catalyst layer. Since the amount of ink sprayed upon start of spraying may be different from that upon completion of the spraying, the spraying was started on the mask and completed on the mask. The belt-like catalyst layer was immediately dried by the heat of the porous metal plate heated by the heater.

Then, as shown in FIG. 7, while the nozzle was moved from the coordinate (116, 12) to the coordinate (4, 12) in the direction of the X axis, the ink was continuously sprayed to form the second belt-like catalyst layer. That is, the shift amount Ys was set to 3 mm. The second belt-like catalyst layer was formed so that the long side (the foot) of the belt overlapped the first belt-like catalyst layer. Likewise, in the third application, the ink was applied to the region from the coordinate (4, 15) to the coordinate (116, 15).

The central parts of the first to third belt-like catalyst layers, i.e., the first linear regions along the straight lines Y=9, Y=12, and Y=15, are the parts of the first regions in which the amount of catalyst per unit area is largest. Also, the central parts between the first linear regions of the adjacent belt-like catalyst layers, i.e., the second linear regions along the straight lines Y=10.5 and Y=13.5, are the parts of the second regions in which the amount of catalyst per unit area is smallest.

In the fourth and subsequent applications, using the same shift amount Ys, while the nozzle was moved, the ink was repeatedly sprayed until it was applied to the $35^{th}$ region from the coordinate (4, 111) to the coordinate (116, 111). In this manner, a primary coating layer for forming a catalyst layer was completed. That is, the number S of shifts was set to 34.

Thereafter, the ink was reapplied to the same $1^{st}$ to $35^{th}$ regions nine times to complete the formation of a catalyst layer. That is, the number Z of laminated coating layers was set to 10, and the number L of times the ink was applied was set to 350. The path of the air brush, the shift amount Ys, and the number Z of laminated layers are hereinafter referred to as an application pattern.

With respect to the amount of catalyst per unit area, i.e., the amount of Pt—Ru alloy, the largest amount in the first regions was 4.1 mg/cm$^2$, and the smallest amount in the second regions was 2.6 mg/cm$^2$. The largest amount was 1.55 times the smallest amount.

The thickness of each of the first linear regions of the catalyst layer (the thickness of the part of the first region in which the amount of catalyst was largest) was 98 μm. The thickness of each of the second linear regions of the catalyst layer (the thickness of the part of the second region in which the amount of catalyst was smallest) was 65 μm. The thickness of the first linear regions was 1.5 times the thickness of the second linear regions. Thus, there is almost no difference in the density of the catalyst layer between the first regions and the second regions.

(ii) Formation of Cathode 10 g of the supported cathode catalyst, 100 g of a liquid dispersion containing a perfluorosulfonic acid/polytetrafluoroethylene copolymer (H$^+$ type) (trade name "Nation® 5 wt % solution" mentioned above), and a suitable amount of water were stirred and mixed with a stirring device. The resultant mixture was defoamed to prepare an ink for forming a cathode catalyst layer.

The cathode-catalyst-layer forming ink was applied onto the face of the polymer electrolyte membrane opposite to the face with the anode catalyst layer by the same method as that used to form the anode catalyst layer. In this manner, a 10-cm square cathode catalyst layer was formed on the polymer electrolyte membrane.

Figure 8:
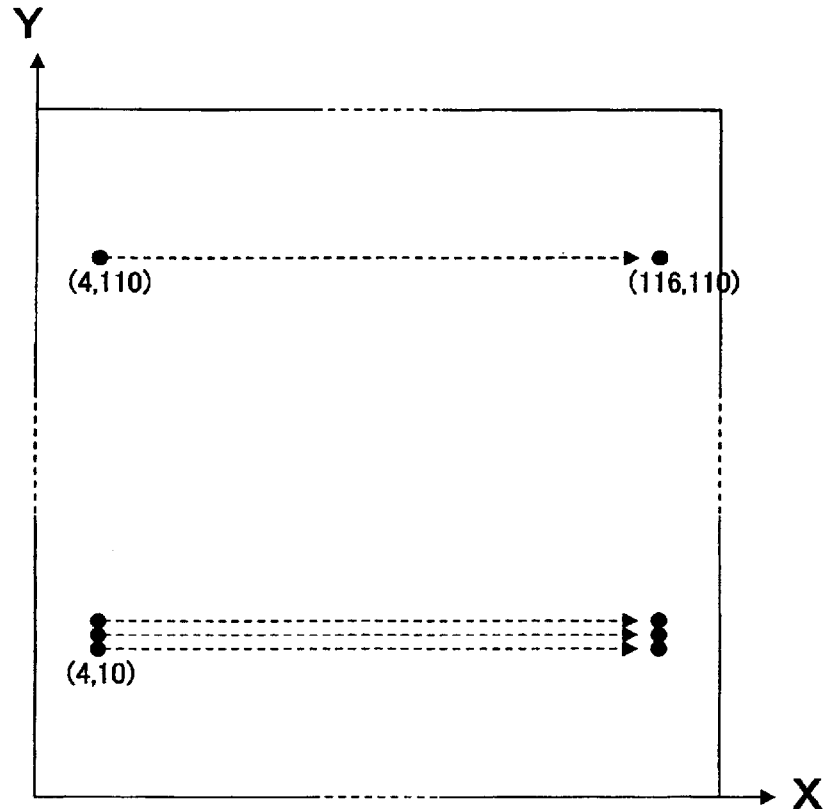
FIG. 8 shows an application pattern of a catalyst ink used to form a cathode catalyst layer according to an Example of the invention.

Specifically, the origin of the coordinate axes was set to the bottom-left vertex of the face of the 12-cm square electrolyte membrane opposite to the face with the anode catalyst layer. As shown in FIG. 8, the first application of the ink was made while the nozzle was moved from the coordinate (4, 10) to the coordinate (116, 10) in the direction of the X axis.

Then, with the shift amount Ys set to 1.0, the ink was repeatedly sprayed until it was applied to the region from the coordinate (4, 110) to the coordinate (116, 110), to complete a primary coating layer for forming a catalyst layer. That is, the number S of shifts was set to 100, and the ink was applied 101 times to form the primary coating layer.

Thereafter, the ink was reapplied to the same $1^{st}$ to $101^{th}$ regions four times to complete the formation of a catalyst layer. That is, the number Z of laminated layers was set to 5, and the number L of times the ink was applied was set to 505.

The amount (average value) of Pt contained in the cathode catalyst layer per unit area was 1 mg/cm$^2$, and the distribution of the amount of catalyst in the catalyst layer was uniform. Specifically, the variation in the amount of catalyst per unit area was less than 10% (the difference between the average value and the largest value or the smallest value was less than 10% of the average value). The thickness of the cathode catalyst layer was 28 μm.

The anode catalyst layer and the cathode catalyst layer were disposed so that their centers overlapped in the thickness direction of the polymer electrolyte membrane. In this manner, a CCM was produced.

(b) Production of MEA (i) Preparation of Anode Porous Substrate

A carbon paper subjected to a water-repellent treatment (trade name "TGP-H-090", approximately 300 μm in thickness, available from Toray Industries Inc.) was immersed in a diluted polytetrafluoroethylene (PTFE) dispersion (trade name "D-1", available from Daikin Industries, Ltd.) for 1 minute. The carbon paper was then dried in a hot air dryer in which the temperature was set to 100° C. Subsequently, the dried carbon paper was baked at 270° C. in an electric furnace for 2 hours. In this manner, an anode porous substrate with a PTFE content of 10% by weight was produced.

(ii) Preparation of Cathode Porous Substrate

A cathode porous substrate with a PTFE content of 10% by weight was produced in the same manner as the anode porous substrate except for the use of a carbon cloth (trade name "AvCarbm 1071HCB", available from Ballard Material Products Inc.) in place of the carbon paper subjected to a water-repellent treatment.

(iii) Formation of Anode Microporous Layer

An acetylene black powder and a PTFE dispersion (trade name "D-1" available from Daikin Industries, Ltd.) were stirred and mixed with a stirring device to prepare an ink for forming a microporous layer having a PTFE content of 10% by weight of the total solid content and an acetylene black content of 90% by weight of the total solid content. The microporous-layer-forming ink was sprayed on one surface of the anode porous substrate by a spray method using an air brush. The sprayed ink was then dried in a thermostat in which the temperature was set to 100° C. Subsequently, the anode porous substrate sprayed with the microporous-layer-forming ink was baked at 270° C. in an electric furnace for 2 hours to remove the surfactant. In this manner, an anode microporous layer was formed on the anode porous substrate to produce an anode diffusion layer including the anode porous substrate and the anode microporous layer. The thickness of the anode microporous layer was 23 μm.

(iv) Formation of Cathode Microporous Layer

A cathode microporous layer was formed on one surface of the cathode porous substrate in the same manner as the anode microporous layer to produce a cathode diffusion layer including the cathode porous substrate and the cathode microporous layer. The thickness of the cathode microporous layer was 18 μm.

The anode diffusion layer and the cathode diffusion layer were formed into a 10-cm square using a punching die.

Subsequently, the anode diffusion layer and the CCM were laminated so that the anode microporous layer was in contact with the anode catalyst layer. Also, the cathode diffusion layer and the CCM were laminated so that the cathode microporous layer was in contact with the cathode catalyst layer.

The resultant laminate was pressed with a pressure of 5 MPa for 1 minute, using a hot press machine whose temperature was set to 125° C. In this manner, the anode catalyst layer and the anode diffusion layer were bonded, and the cathode catalyst layer and the cathode diffusion layer were bonded.

In the above manner, a membrane electrode assembly (MEA) comprising the anode, the polymer electrolyte membrane, and the cathode was produced.

(c) Attachment of Gasket

A 0.25-mm thick sheet of ethylene propylene diene rubber (EPDM) was cut to a 12-cm square. Further, a central part of the sheet was cut off to form a 10.2-cm square opening. In this manner, two gaskets were prepared. The respective gaskets were attached to the MEA so that the anode was fitted into the opening of one of the gaskets while the cathode was fitted into the opening of the other gasket.

(d) Preparation of Separator

A resin-impregnated graphite plate having a thickness of 2 mm and a 12-cm square shape was prepared as a material of a separator. A surface of the graphite plate was cut so that a fuel flow channel for supplying an aqueous methanol solution to the anode was formed on one side. One end of the separator was provided with an inlet of the fuel flow channel, while the other end was provided with an outlet.

A surface of another graphite plate was provided with an air flow channel for supplying air to the cathode as the oxidant. One end of the separator was provided with an inlet of the air flow channel, while the other end was provided with an outlet. In this manner, separators for a fuel cell stack were prepared.

The groove of each of the fuel flow channel and the air flow channel had a width of 1 mm and a depth of 0.5 mm in cross-section. Also, each of the fuel flow channel and the air flow channel was a serpentine one having a plurality of 9.5-cm long linear portions within a 10-cm square, so that the fuel and air could be uniformly supplied to the whole anode diffusion layer and the whole cathode diffusion layer. The pitch of the linear portions of the flow channel was set to 3 mm, which is the same as the shift amount Ys for the belt-like catalyst layers of the anode catalyst layer. That is, the linear portions of the fuel flow channel were designed so that the central parts thereof in the width direction faced the first linear regions of the first regions of the anode catalyst layer corresponding to a plurality of straight lines Y=9+3n where n=0, 1, ... 34.

(e) Production of Cell for DMFC

The MEA and the separators were stacked so that the fuel flow channel of the separator was in contact with the anode diffusion layer, while the air flow channel was in contact with the cathode diffusion layer. At this time, the linear portion of the fuel flow channel closest to the inlet of the fuel flow channel was positioned in the region 1.5 mm to 2.5 mm distant from one side of the anode diffusion layer (the region of the anode catalyst layer defined by straight lines Y=11.5 to 12.5). Also, the respective layers were positioned so that the first regions of the anode catalyst layer substantially faced the linear portions of the fuel flow channel, while the second regions of the anode catalyst layer substantially faced the protruding portions of the separator between the linear portions of the flow channel.

Both ends of the cell stack in the stacking direction were fitted with a pair of end plates comprising 1-cm thick stainless steel plates. A current collector plate comprising a 2-mm thick, gold-plated copper plate and an insulator plate were disposed between each end plate and each separator. The current collector plate was disposed on the separator side, and the insulator plate was disposed on the end plate side. In this state, the pair of end plates was clamped with bolts, nuts, and springs to press the MEA and the respective separators.

In the above manner, a 12-cm square cell for a DMFC was produced. This cell is designated as cell A.

Example 2

A fuel cell was produced in the same manner as in Example 1, except that the application pattern for forming an anode catalyst layer and the shape of the fuel flow channel were changed.

Specifically, the origin of the coordinate axes was set to the same position as that of Example 1, and the first application of the ink was made while the nozzle was moved from the coordinate (4, 8) to the coordinate (116, 8) in the direction of the X axis. Then, with the shift amount Ys set to 2.6, the ink was repeatedly sprayed until it was applied to the region from the coordinate (4, 112) to the coordinate (116, 112), to complete a primary coating layer for forming the catalyst layer. That is, the number S of shifts was set to 40, and the ink was applied 41 times to form the primary coating layer.

Thereafter, the ink was reapplied to the same $1^{st}$ to $41^{st}$ regions eight times to complete the formation of the catalyst layer. That is, the number Z of laminated layers was set to 9, and the number L of times the ink was applied was set to 369.

With respect to the amount of catalyst per unit area, i.e., the amount of Pt—Ru alloy, the largest amount in the first regions was 3.5 mg/cm$^2$, and the smallest amount in the second regions was 3.1 mg/cm$^2$. The largest amount was 1.1 times the smallest amount.

The thickness of each of the first linear regions of the catalyst layer (the thickness of the part of the first region in which the amount of catalyst was largest) was 85 μm. The thickness of each of the second linear regions of the catalyst layer (the thickness of the part of the second region in which the amount of catalyst was smallest) was 76 μm.

The fuel flow channel had a width of 1 mm and a depth of 0.5 mm in the same manner as in Example 1, but the pitch of the linear portions of the flow channel was changed to 2.6 mm. In fabricating a cell, the linear portion of the fuel flow channel closest to the inlet of the fuel flow channel was positioned in the region 2.7 mm to 3.7 mm distant from one side of the anode diffusion layer, so that the first regions of the anode catalyst layer and the linear portions of the fuel flow channel faced one another.

Example 3

A fuel cell was produced in the same manner as in Example 1, except that the application pattern for forming an anode catalyst layer and the shape of the fuel flow channel were changed.

Specifically, the origin of the coordinate axes was set to the same position as that of Example 1, and the first application of the ink was made while the nozzle was moved from the coordinate (4, 8.9) to the coordinate (116, 8.9) in the direction of the X axis. Then, with the shift amount Ys set to 3.3, the ink was repeatedly sprayed until it was applied to the region from the coordinate (4, 111.2) to the coordinate (116, 111.2), to complete a primary coating layer for forming the catalyst layer. That is, the number S of shifts was set to 31, and the ink was applied 32 times to form the primary coating layer.

Thereafter, the ink was reapplied to the same $1^{st}$ to $32^{nd}$ regions nine times to complete the formation of the catalyst layer. That is, the number Z of laminated layers was set to 10, and the number L of times the ink was applied was set to 320.

With respect to the amount of catalyst per unit area, i.e., the amount of Pt—Ru alloy, the largest amount in the first regions was 4.4 mg/cm$^2$, and the smallest amount in the second regions was 2.2 mg/cm$^2$. The largest amount was twice the smallest amount.

The thickness of each of the first linear regions of the catalyst layer (the thickness of the part of the first region in which the amount of catalyst was largest) was 107 μm. The thickness of each of the second linear regions of the catalyst layer (the thickness of the part of the second region in which the amount of catalyst was smallest) was 54 μm.

The fuel flow channel had a width of 1 mm and a depth of 0.5 mm in the same manner as in Example 1, but the pitch of the linear portions of the flow channel was changed to 3.3 mm. In fabricating a cell, the linear portion of the fuel flow channel closest to the inlet of the fuel flow channel was positioned in the region 1.7 mm to 2.7 mm distant from one side of the anode diffusion layer, so that the first regions of the anode catalyst layer and the linear portions of the fuel flow channel faced one another.

Example 4

A fuel cell was produced in the same manner as in Example 1, except that the application pattern for forming a cathode catalyst layer and the shape of the oxidant flow channel were changed.

Specifically, the origin of the coordinate axes was set to the same position as that of Example 1, and the first application of the ink was made while the nozzle was moved from the coordinate (4, 9) to the coordinate (116, 9) in the direction of the X axis. Then, with the shift amount Ys set to 3.0, the ink was repeatedly sprayed until it was applied to the region from the coordinate (4, 111) to the coordinate (116, 111), to complete a primary coating layer for forming the catalyst layer. That is, the number S of shifts was set to 34, and the ink was applied 35 times to form the primary coating layer.

Thereafter, the ink was reapplied to the same $1^{st}$ to $35^{th}$ regions seven times to complete the formation of the catalyst layer. That is, the number Z of laminated layers was set to 8, and the number L of times the ink was applied was set to 280.

With respect to the amount of catalyst per unit area, i.e., the amount of Pt, the largest amount in the first regions was 1.2 mg/cm$^2$, and the smallest amount in the second regions was 0.8 mg/cm$^2$. The largest amount was 1.5 times the smallest amount.

The thickness of each of the first linear regions of the catalyst layer (the thickness of the part of the first region in which the amount of catalyst was largest) was 34 μm. The thickness of each of the second linear regions of the catalyst layer (the thickness of the part of the second region in which the amount of catalyst was smallest) was 23 μm.

The oxidant flow channel had a width of 1 mm and a depth of 0.5 mm in the same manner as in Example 1, but the pitch of the linear portions of the flow channel was changed to 3.0 mm. In fabricating a cell, the linear portion of the oxidant flow channel closest to the inlet of the oxidant flow channel was positioned in the region 1.5 mm to 2.5 mm distant from one side of the cathode diffusion layer (the region of the cathode catalyst layer defined by straight lines Y=11.5 to 12.5), so that the first regions of the cathode catalyst layer and the linear portions of the oxidant flow channel faced one another.

Example 5

A fuel cell was produced in the same manner as in Example 1, except that the application pattern for forming a cathode catalyst layer and the shape of the oxidant flow channel were changed.

Specifically, the origin of the coordinate axes was set to the same position as that of Example 1, and the first application of the ink was made while the nozzle was moved from the coordinate (4, 8) to the coordinate (116, 8) in the direction of the X axis. Then, with the shift amount Ys set to 2.6, the ink was repeatedly sprayed until it was applied to the region from the coordinate (4, 112) to the coordinate (116, 112), to complete a primary coating layer for forming the catalyst layer. That is, the number S of shifts was set to 40, and the ink was applied 41 times to form the primary coating layer.

Thereafter, the ink was reapplied to the same $1^{st}$ to $41^{th}$ regions six times to complete the formation of the catalyst layer. That is, the number Z of laminated layers was set to 7, and the number L of times the ink was applied was set to 287.

With respect to the amount of catalyst per unit area, i.e., the amount of Pt, the largest amount in the first regions was 1.0 mg/cm$^2$, and the smallest amount in the second regions was 0.9 mg/cm$^2$. The largest amount was 1.1 times the smallest amount.

The thickness of each of the first linear regions of the catalyst layer (the thickness of the part of the first region in which the amount of catalyst was largest) was 28 μm. The thickness of each of the second linear regions of the catalyst layer (the thickness of the part of the second region in which the amount of catalyst was smallest) was 26 μm.

The oxidant flow channel had a width of 1 mm and a depth of 0.5 mm in the same manner as in Example 1, but the pitch of the linear portions of the flow channel was changed to 2.6 mm. In fabricating a cell, the linear portion of the oxidant flow channel closest to the inlet of the oxidant flow channel was positioned in the region 2.7 mm to 3.7 mm distant from one side of the cathode diffusion layer, so that the first regions of the cathode catalyst layer and the linear portions of the oxidant flow channel faced one another.

Example 6

A fuel cell was produced in the same manner as in Example 1, except that the application pattern for forming a cathode catalyst layer and the shape of the oxidant flow channel were changed.

Specifically, the origin of the coordinate axes was set to the same position as that of Example 1, and the first application of the ink was made while the nozzle was moved from the coordinate (4, 8.9) to the coordinate (116, 8.9) in the direction of the X axis. Then, with the shift amount Ys set to 3.3, the ink was repeatedly sprayed until it was applied to the region from the coordinate (4, 111.2) to the coordinate (116, 111.2), to complete a primary coating layer for forming the catalyst layer. That is, the number S of shifts was set to 31, and the ink was applied 32 times to form the primary coating layer.

Thereafter, the ink was reapplied to the same $1^{st}$ to $32^{nd}$ regions seven times to complete the formation of the catalyst layer. That is, the number Z of laminated layers was set to 8, and the number L of times the ink was applied was set to 256.

With respect to the amount of catalyst per unit area, i.e., the amount of Pt, the largest amount in the first regions was 1.5 mg/cm$^2$, and the smallest amount in the second regions was 0.75 mg/cm$^2$. The largest amount was 2.0 times the smallest amount.

The thickness of each of the first linear regions of the catalyst layer (the thickness of the part of the first region in which the amount of catalyst was largest) was 41 μm. The thickness of each of the second linear regions of the catalyst layer (the thickness of the part of the second region in which the amount of catalyst was smallest) was 22 μm.

The oxidant flow channel had a width of 1 mm and a depth of 0.5 mm in the same manner as in Example 1, but the pitch of the linear portions of the flow channel was changed to 3.3 mm. In fabricating a cell, the linear portion of the oxidant flow channel closest to the inlet of the oxidant flow channel was positioned in the region 1.7 mm to 2.7 mm distant from one side of the cathode diffusion layer, so that the first regions of the cathode catalyst layer and the linear portions of the oxidant flow channel faced one another.

Comparative Example 1

A fuel cell was produced in the same manner as in Example 1, except that the application pattern for forming an anode catalyst layer was changed.

Specifically, the origin of the coordinate axes was set to the same position as that of Example 1, and the first application of the ink was made while the nozzle was moved from the coordinate (4, 10) to the coordinate (116, 10) in the direction of the X axis. Then, with the shift amount Ys set to 1.0, the ink was repeatedly sprayed until it was applied to the region from the coordinate (4, 110) to the coordinate (116, 110), to complete a primary coating layer for forming the catalyst layer. That is, the number S of shifts was set to 100, and the ink was applied 101 times to form the primary coating layer.

Thereafter, the ink was reapplied to the same $1^{st}$ to $101^{st}$ regions six times to complete the formation of the catalyst layer. That is, the number Z of laminated layers was set to 7, and the number L of times the ink was applied was set to 707.

The amount (average value) of Pt—Ru alloy contained in the anode catalyst layer per unit area was 3.5 mg/cm$^2$, and the distribution of the amount of catalyst in the catalyst layer was uniform. Specifically, the variation in the amount of catalyst per unit area was less than 10% (the difference between the average value and the largest value or the smallest value was less than 10% of the average value). The thickness of the anode catalyst layer was 85 μm.

[Evaluation Test]

Using the fuel cells of Examples 1 to 6 and the fuel cell of Comparative Example 1, the power generation performance and the amount of methanol crossover during power generation were evaluated, and the fuel utilization rates were calculated from the evaluation results.

The amounts of air and fuel supplied to the fuel cell were precisely adjusted to heighten the accuracy of the experiment. The air was not supplied by a common air pump, and instead, compressed air supplied from a high pressure air cylinder was supplied to the cell by using a massflow controller of Horiba, Ltd. to adjust the flow rate thereof. The fuel was supplied by using a precision pump (personal pump NP-KX-100 (product name)) available from Nihon Seimitu Kagaku Co. Ltd.

The power generation conditions of the fuel cells are as follows.

A 4 mol/L aqueous methanol solution was supplied to the anode as the fuel at a flow rate of 0.3 cm$^3$/min by using the tubular pump. Unhumidified air was supplied to the cathode at a flow rate of 300 cm$^3$/min by using the massflow controller. Using a heating wire (heater) and a temperature controller, the cell temperature was controlled at 60° C. The fuel cell was connected to an electronic load unit PLZ164WA (available from Kikusui Electronics Corporation) and operated to generate power continuously at a constant current density of 200 mA/cm$^2$.

The gas-liquid mixture fluid composed of carbon dioxide and the aqueous methanol solution containing unused methanol, discharged from the anode, was introduced into a gas collecting container filled with pure water. In this manner, gaseous and liquid methanol was collected for 1 hour. At this time, the gas collecting container was cooled by an ice water bath.

The amount of methanol in the gas collecting container was measured by gas chromatography, and the amount of methanol crossover (the amount of MCO) was determined by calculating the material balance of the anode. That is, the amount of MCO was determined by subtracting, from the amount of methanol supplied to the anode, the amount of collected methanol and the amount of methanol consumed at the anode calculated from the amount of current generated. Herein, the value of current that can be generated if crossover methanol (the amount of MCO) is oxidized at the electrode was used. The fuel utilization rate was determined from the following calculation formula (B).

Fuel utilization rate=(current generated)/(current generated+value of current converted from amount of MCO) (B)

Table 1 shows the above results. Also, Table 1 shows the numbers L of times the ink was applied to form the anode catalyst layer and the cathode catalyst layer (values obtained by the following calculation formula (C)) for each of Examples and Comparative Example.

Number L of times ink was applied=(number S of shifts+1)×(number Z of laminated layers) (C)

TABLE 1

|  | Number of times ink was applied to form anode catalyst layer | Number of times ink was applied to form cathode catalyst layer | Voltage generated (V) | Fuel utilization rate (%) |
| --- | --- | --- | --- | --- |
| Example 1 | 350 | 505 | 0.46 | 82.5 |
| Example 2 | 369 | 505 | 0.44 | 80.2 |
| Example 3 | 320 | 505 | 0.40 | 85.1 |
| Example 4 | 350 | 280 | 0.48 | 82.6 |
| Example 5 | 350 | 287 | 0.46 | 82.1 |

TABLE 1-continued

| | Number of times ink was applied to form anode catalyst layer | Number of times ink was applied to form cathode catalyst layer | Voltage generated (V) | Fuel utilization rate (%) |
|---|---|---|---|---|
| Example 6 | 350 | 256 | 0.40 | 83.0 |
| Comparative Example 1 | 707 | 505 | 0.38 | 77.4 |

As is clear from Table 1, the fuel cells according to Examples of the invention are superior in both power generation performance and fuel utilization rate, although the number of steps necessary for forming a catalyst layer is significantly reduced. In particular, in terms of power generation performance, Examples 1 and 4, in which the ratio of the largest amount of catalyst in the first regions to the smallest amount of catalyst in the second regions for each of the anode and cathode catalyst layers is approximately 1.5, exhibit the best performance.

When the ratio of the largest amount of catalyst in the first regions to the smallest amount of catalyst in the second regions is as high as 2.0, the power generation performance lowers slightly. This is probably for the following reasons. Due to the large difference in thickness between the first regions and the second regions, the adjacent microporous layer does not fully conform to the surface roughness of the catalyst layer. As a result, gaps are formed between the second regions and the microporous layer, and the contact resistance between the two layers increases. In particular, in the cathode, product water builds up in the gaps, thereby interfering with air diffusion. Thus, the advantageous effects of the invention decrease slightly, compared with when the ratio of the largest amount of catalyst in the first regions to the smallest amount of catalyst in the second regions is approximately 1.5.

However, with respect to the fuel utilization rate, when the ratio of the largest amount of catalyst in the first regions to the smallest amount of catalyst in the second regions is 2.0, the value is highest. This is probably for the following reasons. Since the first regions to which the fuel is smoothly supplied contain a large amount of catalyst, the reaction proceeds smoothly and a large amount of fuel is consumed. Also, due to the increase of the thickness of the catalyst layer, the diffusion distance of the fuel in the catalyst layer increases, so the concentration of the fuel reaching the interface between the electrolyte membrane and the anode catalyst layer lowers, thereby significantly reducing methanol crossover.

As described above, the invention can decrease the number of steps necessary for forming a catalyst layer to reduce the production costs of a fuel cell, while allowing a catalyst to be disposed intensively on the portions to which a fuel and an oxidant are smoothly supplied. Therefore, the invention can provide a fuel cell with good power generation performance.

The invention is useful in the field of fuel cells applied to, for example, power sources for portable small electronic devices such as notebook personal computers, cellular phones, and personal digital assistants (PDAs), portable power sources in outdoor leisure activities such as camping, and power sources for electric scooters.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A polymer electrolyte fuel cell including at least one cell that comprises:
a membrane electrode assembly including an anode, a cathode, and an electrolyte membrane disposed between the anode and the cathode, the anode including an anode catalyst layer containing an anode catalyst on one main surface of the electrolyte membrane and an anode diffusion layer laminated on the anode catalyst layer, the cathode including a cathode catalyst layer containing a cathode catalyst on the other main surface of the electrolyte membrane and a cathode diffusion layer laminated on the cathode catalyst layer;
an anode-side separator having a surface with a fuel flow channel for supplying a fuel to the anode; and
a cathode-side separator having a surface with an oxidant flow channel for supplying an oxidant to the cathode,
wherein at least one of the fuel flow channel and the oxidant flow channel has a plurality of parallel linear portions,
at least one of the anode catalyst layer and the cathode catalyst layer has a plurality of belt-like first regions facing the plurality of linear portions and at least one second region between the adjacent first regions,
the amount of catalyst in the first regions per unit area is on average larger than the amount of catalyst n the at least one second region per unit area,
in the first regions, the amount of catalyst per unit area increases from an end toward a center in a width direction thereof, and
in the at least one second region, the amount of catalyst per unit area decreases from an end toward a center in a width direction thereof.

2. The polymer electrolyte fuel cell in accordance with claim 1, wherein
the largest amount of catalyst in the first regions per unit area is not less than 1.1 times and not more than twice the smallest amount of catalyst in the at least one second region per unit area.

3. The polymer electrolyte fuel cell in accordance with claim 2, wherein the portion of each of the first regions in which the amount of catalyst per unit area is largest faces a central part of each of the linear portions in a width direction thereof, and
the portion of the at least one second region in which the amount of catalyst per unit area is smallest faces a central part of the surface (land) of the separator between the adjacent linear portions in a width direction thereof.

4. The polymer electrolyte fuel cell in accordance with claim 1, wherein the total width of a pair of the first and second regions is 1 mm or more and 5 mm or less.

5. The polymer electrolyte fuel cell in accordance with claim 1, wherein at least one of the anode diffusion layer and the cathode diffusion layer includes a substrate comprising conductive fibers and a microporous layer including conductive particles and a water-repellent resin, and
the microporous layer is in contact with the anode catalyst layer or the cathode catalyst layer in such a manner that no gaps are formed between the microporous layer and the first regions and between the microporous layer and the at least one second region.

6. The polymer electrolyte fuel cell in accordance with claim 1, wherein the ratio of the total area of the first regions and the at least one second region to the projected area of the anode catalyst layer or the cathode catalyst layer is 70 to 100%.

7. The polymer electrolyte fuel cell in accordance with claim 1, wherein the average thickness of the first regions is greater than that of the at least one second region.

8. The polymer electrolyte fuel cell in accordance with claim 1, wherein at least one of the fuel flow channel and the oxidant flow channel is a serpentine flow channel having the linear portions and curved portions for connecting an adjacent pair of the linear portions.

9. The polymer electrolyte fuel cell in accordance with claim 1, wherein the fuel is at least one selected from the group consisting of methanol, ethanol, ethylene glycol, and dimethyl ether.

* * * * *